(12) United States Patent
Ohmoto et al.

(10) Patent No.: US 7,376,575 B2
(45) Date of Patent: May 20, 2008

(54) DESIGNING PROGRAM AND METHOD OF FINANCIAL ARTICLE AND RECORDING MEDIUM STORING FINANCIAL ARTICLE DESIGNING PROGRAM

(75) Inventors: Hideki Ohmoto, Tokyo (JP); Chizuko Emura, Tokyo (JP); Eiko Kuwagata, Tokyo (JP); Hideki Kakimoto, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 978 days.

(21) Appl. No.: 09/947,530

(22) Filed: Sep. 7, 2001

(65) Prior Publication Data

US 2002/0035490 A1    Mar. 21, 2002

Related U.S. Application Data

(63) Continuation-in-part of application No. 09/760,882, filed on Jan. 17, 2001, now abandoned.

(30) Foreign Application Priority Data

Mar. 3, 2000  (JP)  ............................. 2000-058818
Mar. 2, 2001  (JP)  ............................. 2001-057665

(51) Int. Cl.
    *G06F 19/00*    (2006.01)
(52) U.S. Cl. ........................................................ 705/4
(58) Field of Classification Search ..................... 705/4
    See application file for complete search history.

(56) References Cited

U.S. PATENT DOCUMENTS 4,642,768 A * 2/1987 Roberts ......................... 705/4

4,831,526 A * 5/1989 Luchs et al. ..................... 705/4

(Continued)

FOREIGN PATENT DOCUMENTS

JP        08287159        11/1996

(Continued)

OTHER PUBLICATIONS

Thompson, Howard. "The Use of Customer Attitude Assesment In Pricing . . . " Jun. 1975. Industrial Marketing Mgt. vol. 4, Iss. 2,3. p. 107.*

(Continued)

*Primary Examiner*—C. Luke Gilligan
*Assistant Examiner*—Michael Tomaszewski
(74) *Attorney, Agent, or Firm*—Staas & Halsey LLP

(57) ABSTRACT

An information input unit inputs information necessary for designing an insurance. A risk recognition degree calculating unit calculates a risk recognition degree from qualitative information such as an anxiety degree and the like showing the recognition of the individual customer for a risk by searching a database or the like. A compensation amount calculating unit calculates necessary compensation amounts for the risks by attribute information of the individual customers. An output display unit outputs and displays a map image in which the risk recognition degrees are set to lengths of branches extending from the center and the necessary compensation amounts are shown by sizes of circles at the edges of the branches. An article designing unit designs an optimum insurance article which satisfies the necessary compensation amounts for the risks displayed by the output display unit and provides the same.

21 Claims, 38 Drawing Sheets

U.S. PATENT DOCUMENTS

| | | | |
|---|---|---|---|
| 4,975,840 A * | 12/1990 | DeTore et al. | 705/4 |
| 5,523,942 A * | 6/1996 | Tyler et al. | 705/4 |
| 5,812,987 A * | 9/1998 | Luskin et al. | 705/36 R |
| 5,956,691 A * | 9/1999 | Powers | 705/4 |
| 6,684,190 B1 * | 1/2004 | Powers et al. | 705/36 R |
| 2004/0024620 A1 * | 2/2004 | Robertson et al. | 705/4 |
| 2005/0144108 A1 * | 6/2005 | Loeper | 705/36 |

FOREIGN PATENT DOCUMENTS

| | | |
|---|---|---|
| JP | 10254951 A * | 9/1998 |
| WO | WO 9120071 A1 * | 12/1991 |
| WO | WO 2006053087 A2 * | 5/2006 |

OTHER PUBLICATIONS

Hammerberg, Ron. "Using Computerized Proposals And Other Sales Strategies" Nov. 1989. American Agent & Broker. vol. 61, Iss. 11. p. 56.*

Hammerberg, Ron. "Using Computerized Proposals and Other Sales Strategies" Nov. 1989. American Agent & Broker. vol. 61, Iss. 11. p. 56.*

Thompson, Howard. "The Use of Customer Attitude Assessment in Pricing . . . " Jun. 1975. Industrial Marketing Mgt. vol. 4, Iss. 2, 3. p. 107.*

* cited by examiner

FIG. 3A

46 INDIVIDUAL CUSTOMER ATTRIBUTE INFORMATION

| ATTRIBUTION ITEMS | CONTENTS | | | | | |
|---|---|---|---|---|---|---|
| SEX | MALE | FEMALE | | | | |
| DATE OF BIRTH | MONTH/DAY/YEAR | | | | | |
| REGION OF RESIDENCE | PREFECTURE NAME | | | | | |
| OCCUPATION | COMPANY EMPLOYEE | OFFICE-HOLDER | SELF-MANAGEMENT | STUDENT | HOUSEWIFE | PART-TIME JOB | SPECIALIST | TEACHER | INOCCUPATION |
| MARITAL STATUS | MARRIED | UNMARRIED | | | | |
| ANNUAL INCOME | ~¥1 MILLION | ~¥5 MILLION | ~¥10 MILLION | ~¥20 MILLION | ~¥30 MILLION | ≧¥30 MILLION |
| ⋮ | | | | | | |

FIG. 3B

48 QUANTITATIVE INFORMATION

| RISK ITEMS | RECOGNITION OF RISK | | | |
|---|---|---|---|---|
| DEATH | VERY ANXIOUS | SLIGHTLY ANXIOUS | NOT VERY ANXIOUS | NOT ANXIOUS |
| ACCIDENT·DISASTER | VERY ANXIOUS | SLIGHTLY ANXIOUS | NOT VERY ANXIOUS | NOT ANXIOUS |
| SICKNESS | VERY ANXIOUS | SLIGHTLY ANXIOUS | NOT VERY ANXIOUS | NOT ANXIOUS |
| OLD AGE | VERY ANXIOUS | SLIGHTLY ANXIOUS | NOT VERY ANXIOUS | NOT ANXIOUS |
| LIVING | VERY ANXIOUS | SLIGHTLY ANXIOUS | NOT VERY ANXIOUS | NOT ANXIOUS |
| INFLATION | VERY ANXIOUS | SLIGHTLY ANXIOUS | NOT VERY ANXIOUS | NOT ANXIOUS |
| ⋮ | VERY ANXIOUS | SLIGHTLY ANXIOUS | NOT VERY ANXIOUS | NOT ANXIOUS |

FIG. 3C

50 OTHER COMPANY
· CONTRACTED INFORMATION

| KIND OF INSURANCE | CONTENTS | | | |
|---|---|---|---|---|
| MAIN CONTRACT | PERMANENT ¥ooo | TERM ¥ooo EXPIRED IN oo YEAR | PERSONAL PENSION YEARLY AMOUNT : ¥oo TERM oo YEARS | ·· |
| SPECIAL CONTRACT | TERM ¥ooo | HOSPITALIZATION ¥oo/DAY | SPECIFIED SICKNESS ¥ooo | ·· |
| ·· | | | | |

FIG. 3D

52 EVENT INFORMATION

| EVENT ITEMS | CONTENTS | DATE |
|---|---|---|
| MARRIAGE | YES | 2001 |
| BIRTH OF FIRST CHILD | YES | 2003 |
| BIRTH OF SECOND CHILD | YES | 2005 |
| PURCHASE OF RESIDENCE | YES | 2010 |
| ·· | YES | ·· |

CONFIDENCE DEGREE 50%

| PRIORITY | RISK ITEMS | NECESSARY COMPENSATION AMOUNT | MONTHLY PREMIUM |
|---|---|---|---|
| 1 | PERSONAL | ¥30 MILLION | ¥13400 |
| 2 | ECONOMICAL | ¥10 MILLION | ¥4400 |
| 3 | HOUSEHOLD | ¥8 MILLION | ¥3600 |
| 4 | NATURAL | ¥5 MILLION | ¥2200 |
| 5 | SOCIAL | ¥3 MILLION | ¥1400 |
| TOTAL | | ¥56 MILLION | ¥25000 |

FIG. 6A

54 INDIVIDUAL EXAMPLE INFORMATION

| INDIVIDUAL CUSTOMER ATTRIBUTE | QUANTITATIVE INFORMATION | RISK RECOGNITION DEGREE | COMPENSATION AMOUNT | SUBSCRIBED INSURANCE ARTICLE | SIMULATION HISTORY | ...... |
|---|---|---|---|---|---|---|
| 64 | 65 | 66 | 68 | 70 | 72 | |

DEMOGRAPHIC DATA | PSYCHOGRAPHIC DATA

| INDIVIDUAL CUSTOMER ATTRIBUTE | QUANTITATIVE INFORMATION | RISK RECOGNITION DEGREE | COMPENSATION AMOUNT | SUBSCRIBED INSURANCE ARTICLE |
|---|---|---|---|---|

{ INDIVIDUAL EXAMPLE INFORMATION : 1 RECORD/PERSON
  EXAMPLE INFORMATION PER SEGMENT : 1 RECORD/SEGMENT }

FIG. 6B

58 INDIVIDUAL CUSTOMER INFORMATION

| INDIVIDUAL CUSTOMER ATTRIBUTE | QUANTITATIVE INFORMATION | EVENT INFORMATION | RISK RECOGNITION DEGREE | COMPENSATION AMOUNT | SUBSCRIBED INSURANCE ARTICLE | SIMULATION HISTORY | ...... |
|---|---|---|---|---|---|---|---|
| 74 | 76 | 78 | 80 | 82 | 84 | 86 | |

FIG. 6C

22 INSURANCE ARTICLE DATABASE

| MAIN CONTRACT INFORMATION | SPECIAL CONTRACT INFORMATION | RESTRICTION INFORMATION | ...... |
|---|---|---|---|
| 90 | 92 | 94 | |

INDIVIDUAL CUSTOMER ATTRIBUTE INFORMATION  64

| SEX | AGE | ADDRESS | OCCUPATION | MARITAL STATUS | ANNUAL INCOME | ..... |
|---|---|---|---|---|---|---|
| MALE | ≤20 | | | | | |
| MALE | 21~29 | | | | | |
| MALE | 30~39 | | | | | |
| MALE | 40~49 | | | | | |
| MALE | 50~59 | | | | | |
| MALE | ≥60 | | | | | |
| .. | .. | | | | | |

FIG. 7B

INDIVIDUAL CUSTOMER QUANTITATIVE INFORMATION  65

| DEATH | ACCIDENT·DISASTER | SICKNESS | OLD AGE | LIVING | .... |
|---|---|---|---|---|---|
| VERY ANXIOUS | VERY ANXIOUS | VERY ANXIOUS | SLIGHTLY ANXIOUS | VERY ANXIOUS | |
| NOT ANXIOUS | NOT ANXIOUS | NOT VERY ANXIOUS | NOT ANXIOUS | NOT ANXIOUS | |
| NOT ANXIOUS | SLIGHTLY ANXIOUS | NOT ANXIOUS | SLIGHTLY ANXIOUS | VERY ANXIOUS | |
| SLIGHTLY ANXIOUS | VERY ANXIOUS | VERY ANXIOUS | VERY ANXIOUS | VERY ANXIOUS | |
| NOT VERY ANXIOUS | SLIGHTLY ANXIOUS | NOT VERY ANXIOUS | SLIGHTLY ANXIOUS | NOT ANXIOUS | |
| VERY ANXIOUS | SLIGHTLY ANXIOUS | VERY ANXIOUS | VERY ANXIOUS | NOT ANXIOUS | |
| SLIGHTLY ANXIOUS | VERY ANXIOUS | VERY ANXIOUS | SLIGHTLY ANXIOUS | NOT ANXIOUS | |
| .. | .. | .. | .. | .. | |

FIG. 7C

| | RISK RECOGNITION DEGREE | | | | |
|---|---|---|---|---|---|
| DEATH | ACCIDENT·DISASTER | SICKNESS | OLD AGE | LIVING | ⋯ |
| 0.5 | 0.6 | 0.6 | 0.5 | 0.7 | |
| 0.3 | 0.3 | 0.2 | 0.1 | 0.1 | |
| 0.3 | 0.6 | 0.3 | 0.1 | 0.3 | |
| 0.4 | 0.5 | 0.4 | 0.2 | 0.7 | |
| 0.5 | 0.8 | 0.6 | 0.6 | 0.9 | |
| 0.7 | 0.7 | 0.8 | 0.9 | 0.9 | |
| 0.9 | 0.6 | 0.9 | 0.7 | 0.8 | |

| | COMPENSATION AMOUNT FOR RISK | | | | |
|---|---|---|---|---|---|
| DEATH | ACCIDENT・DISASTER | | SICKNESS | | |
| DEATH COMPENSATION | DEATH COMPENSATION | HOSPITALIZATION COMPENSATION | ... | SERIOUS SICKNESS COMPENSATION | MEDICAL COMPENSATION | ... |
| ¥50 MILLION | ¥50 MILLION | | ... | | | ... |
| ¥20 MILLION | ¥20 MILLION | | | | | |
| ¥50 MILLION | ¥50 MILLION | | | | | |
| ¥100 MILLION | ¥100 MILLION | | | | | |
| ¥200 MILLION | ¥200 MILLION | | | | | |
| ¥100 MILLION | ¥100 MILLION | | | | | |
| : | : | | | | | |

| COMPENSATION AMOUNT FOR RISK | | | | 70 |
|---|---|---|---|---|
| OLD AGE | | LIVING | | SUBSCRIBED INSURANCE ARTICLE |
| PERSONAL PENSION | NURSING COMPENSATION | ... | INCOME COMPENSATION | ... | PERMANENT LIFE INSURANCE |
| ... | ... | ... | ... | ... | ¥30 MILLION |
| | | | | | ¥5 MILLION |
| | | | | | ¥50 MILLION |
| | | | | | ¥100 MILLION |
| | | | | | ¥100 MILLION |
| | | | | | : |

FIG. 7F

| SUBSCRIBED INSURANCE ARTICLE (70) | | | | | SIMULATION HISTORY (72) | |
|---|---|---|---|---|---|---|
| TERM INSURANCE | | ANNUITY INSURANCE | | ... | nTH SIMULATION RESULT | |
| COMPENSATION AMOUNT | PERIOD | ANNUAL AMOUNT RECEIVABLE | PERIOD | | INDIVIDUAL CUSTOMER ATTRIBUTE | RISK RECOGNITION |
| ... | | | | | | |
| | | | | | | |
| | | | | | | |
| | | | | | | |
| | | | | | | |
| | | | | | | |

FIG. 7G

| SIMULATION HISTORY (72) | | |
|---|---|---|
| nTH SIMULATION RESULT | | ... |
| COMPENSATION AMOUNT | INSURANCE DESIGN | |
| | | |
| | | |
| | | |
| | | |
| | | |
| | | |

FIG. 8A 56-1 EXAMPLE INFORMATION PER SEX

| INDIVIDUAL CUSTOMER ATTRIBUTE INFORMATION | RISK RECOGNITION DEGREE | | | | | |
|---|---|---|---|---|---|---|
| SEX | DEATH | ACCIDENT·DISASTER | SICKNESS | OLD AGE | LIVING | ...... |
| MALE | 0.5 | 0.6 | 0.3 | 0.5 | 0.4 | |
| FEMALE | 0.3 | 0.7 | 0.2 | 0.1 | 0.3 | |

FIG. 8B 56-2 EXAMPLE INFORMATION PER AGE

| INDIVIDUAL CUSTOMER ATTRIBUTE INFORMATION | RISK RECOGNITION DEGREE | | | | | |
|---|---|---|---|---|---|---|
| AGE | DEATH | ACCIDENT·DISASTER | SICKNESS | OLD AGE | LIVING | ...... |
| ≦20 | 0.9 | 0.7 | 0.8 | 0.9 | 0.9 | |
| 21〜29 | 0.7 | 0.4 | 0.7 | 0.9 | 0.7 | |
| 30〜39 | 0.6 | 0.5 | 0.6 | 0.8 | 0.3 | |
| 40〜49 | 0.4 | 0.2 | 0.6 | 0.4 | 0.1 | |
| 50〜59 | 0.3 | 0.2 | 0.4 | 0.1 | 0.1 | |
| ≧60 | 0.1 | 0.1 | 0.1 | 0.2 | 0.3 | |

FIG. 8C 56-3 EXAMPLE INFORMATION PER SEX/AGE

| INDIVIDUAL CUSTOMER ATTRIBUTE INFORMATION || RISK RECOGNITION DEGREE |||||  |
|---|---|---|---|---|---|---|---|
| SEX | AGE | DEATH | ACCIDENT·DISASTER | SICKNESS | OLD AGE | LIVING | ...... |
| MALE | ≦20 | 0.9 | 0.7 | 0.8 | 0.9 | 0.9 | |
| | 21~29 | 0.7 | 0.4 | 0.7 | 0.9 | 0.7 | |
| | 30~39 | 0.6 | 0.5 | 0.6 | 0.8 | 0.3 | |
| | 40~49 | 0.4 | 0.2 | 0.6 | 0.4 | 0.1 | |
| | 50~59 | 0.3 | 0.2 | 0.4 | 0.1 | 0.1 | |
| | ≧60 | 0.1 | 0.1 | 0.1 | 0.2 | 0.3 | |
| FEMALE | ≦20 | 0.9 | 0.7 | 0.8 | 0.9 | 0.9 | |
| | 21~29 | 0.7 | 0.6 | 0.7 | 0.8 | 0.7 | |
| | 30~39 | 0.5 | 0.5 | 0.7 | 0.7 | 0.3 | |
| | 40~49 | 0.3 | 0.4 | 0.5 | 0.4 | 0.1 | |
| | 50~59 | 0.2 | 0.2 | 0.3 | 0.1 | 0.1 | |
| | ≧60 | 0.1 | 0.1 | 0.1 | 0.1 | 0.1 | |

FIG. 9A 56-1 EXAMPLE INFORMATION PER SEX

| INDIVIDUAL CUSTOMER ATTRIBUTE INFORMATION | | RISK RECOGNITION DEGREE | | | | | | |
|---|---|---|---|---|---|---|---|---|
| | | DEATH | ACCIDENT·DISASTER | | | SICKNESS | | |
| SEX | | DEATH COMPENSATION | DEATH COMPENSATION | HOSPITALIZATION COMPENSATION | ... | SERIOUS SICKNESS COMPENSATION | ... | MEDICAL COMPENSATION | ... |
| MALE | | ¥50 MILLION | ¥50 MILLION | ... | ... | ... | ... | ... |
| FEMALE | | ¥20 MILLION | ¥20 MILLION | ... | ... | ... | ... | ... |

| RISK RECOGNITION DEGREE | | | |
|---|---|---|---|
| OLD AGE | | LIVING | |
| PERSONAL PENSION | NURSING COMPENSATION | ... | INCOME COMPENSATION | ... |
| ... | ... | ... | ... | ... |
| ... | ... | ... | ... | ... |

FIG. 9B 56-2 EXAMPLE INFORMATION PER AGE

| INDIVIDUAL CUSTOMER ATTRIBUTE INFORMATION | RISK RECOGNITION DEGREE | | | | | |
|---|---|---|---|---|---|---|
| | DEATH | ACCIDENT·DISASTER | | SICKNESS | | |
| AGE | DEATH COMPENSATION | DEATH COMPENSATION | HOSPITALIZATION COMPENSATION | ····· | SERIOUS SICKNESS COMPENSATION | MEDICAL COMPENSATION | ····· |
| ≦20 | ¥5 MILLION | ¥5 MILLION | | | | | |
| 21~29 | ¥20 MILLION | ¥20 MILLION | | | | | |
| 30~39 | ¥50 MILLION | ¥50 MILLION | | | | | |
| 40~49 | ¥100 MILLION | ¥100 MILLION | | | | | |
| 50~59 | ¥200 MILLION | ¥200 MILLION | | | | | |
| ≧60 | ¥100 MILLION | ¥100 MILLION | | | | | |

| RISK RECOGNITION DEGREE | | | |
|---|---|---|---|
| OLD AGE | | LIVING | |
| PERSONAL PENSION | NURSING COMPENSATION | ····· | INCOME COMPENSATION | ····· |

FIG. 9C 56-3 EXAMPLE INFORMATION PER SEX/AGE

| INDIVIDUAL CUSTOMER ATTRIBUTE INFORMATION | | RISK RECOGNITION DEGREE | | | | | |
|---|---|---|---|---|---|---|---|
| | | DEATH | ACCIDENT·DISASTER | | | SICKNESS | |
| SEX | AGE | DEATH COMPENSATION | DEATH COMPENSATION | HOSPITALIZATION COMPENSATION | ... | SERIOUS SICKNESS COMPENSATION | MEDICAL COMPENSATION |
| MALE | ≦20 | ¥5 MILLION | ¥5 MILLION | ... | ... | ... | ... |
| | 21~29 | ¥20 MILLION | ¥20 MILLION | | | | |
| | 30~39 | ¥50 MILLION | ¥50 MILLION | | | | |
| | 40~49 | ¥100 MILLION | ¥100 MILLION | | | | |
| | 50~59 | ¥200 MILLION | ¥200 MILLION | | | | |
| | ≧60 | ¥100 MILLION | ¥100 MILLION | | | | |
| FEMALE | ≦20 | ¥5 MILLION | ¥5 MILLION | ... | ... | ... | ... |
| | 21~29 | ¥10 MILLION | ¥10 MILLION | | | | |
| | 30~39 | ¥20 MILLION | ¥20 MILLION | | | | |
| | 40~49 | ¥20 MILLION | ¥20 MILLION | | | | |
| | 50~59 | ¥20 MILLION | ¥20 MILLION | | | | |
| | ≧60 | ¥20 MILLION | ¥20 MILLION | | | | |

FIG. 9D 56-3

| RISK RECOGNITION DEGREE | | | | | | | |
|---|---|---|---|---|---|---|---|
| OLD AGE | | | LIVING | | | | |
| PERSONAL PENSION | NURSING COMPENSATION | ... | INCOME COMPENSATION | ... | ... | ... | ... |
| ... | ... | ... | ... | | | ... | |
| ... | ... | ... | ... | | | ... | |
| | | | | | | | |
| | | | | | | | |
| | | | | | | | |
| | | | | | | | |
| ... | ... | ... | ... | | | ... | |
| | | | | | | | |
| | | | | | | | |
| | | | | | | | |
| | | | | | | | |

| | | | INDIVIDUAL CUSTOMER ATTRIBUTE INFORMATION | | | | |
|---|---|---|---|---|---|---|---|
| | SEX | BIRTHDAY | ADDRESS | OCCUPATION | MARITAL STATUS | ANNUAL INCOME (¥TEN THOUSAND) | ... |
| Mr. A | MALE | MAY 15, 1960 | AOMORI | COMPANY EMPLOYEE | MARRIED | 700 | |
| Miss. B | FEMALE | AUG. 3, 1975 | TOKYO | STUDENT | UNMARRIED | 0 | |
| Mr. C | MALE | OCT. 24, 1980 | SAITAMA | PART-TIME JOB | UNMARRIED | 90 | |
| Miss. D | FEMALE | FEB. 1, 1955 | YAMAGUCHI | TEACHER | MARRIED | 750 | |
| Miss. E | FEMALE | MAR. 10, 1948 | KAGOSHIMA | HOUSEWIFE | MARRIED | 0 | |
| Mr. F | MALE | JUL. 31, 1962 | MIYAGI | DOCTOR | UNMARRIED | 1000 | |
| Mr. G | MALE | DEC. 8, 1940 | KANAGAWA | INOCCUPATION | MARRIED | 100 | |
| .. | | | | | | .. | |

| | INDIVIDUAL CUSTOMER QUANTITATIVE INFORMATION | | | | |
|---|---|---|---|---|---|
| DEATH | ACCIDENT-DISASTER | SICKNESS | OLD AGE | LIVING | ... |
| VERY ANXIOUS | VERY ANXIOUS | VERY ANXIOUS | SLIGHTLY ANXIOUS | VERY ANXIOUS | |
| NOT ANXIOUS | NOT ANXIOUS | NOT VERY ANXIOUS | NOT ANXIOUS | NOT ANXIOUS | |
| NOT ANXIOUS | SLIGHTLY ANXIOUS | NOT ANXIOUS | NOT ANXIOUS | VERY ANXIOUS | |
| SLIGHTLY ANXIOUS | VERY ANXIOUS | VERY ANXIOUS | SLIGHTLY ANXIOUS | VERY ANXIOUS | |
| NOT VERY ANXIOUS | SLIGHTLY ANXIOUS | NOT VERY ANXIOUS | VERY ANXIOUS | NOT ANXIOUS | |
| VERY ANXIOUS | SLIGHTLY ANXIOUS | VERY ANXIOUS | SLIGHTLY ANXIOUS | VERY ANXIOUS | |
| SLIGHTLY ANXIOUS | VERY ANXIOUS | VERY ANXIOUS | SLIGHTLY ANXIOUS | NOT ANXIOUS | |
| .. | | | | .. | |

| MARRIAGE | BIRTH OF FIRST CHILD | BIRTH OF SECOND CHILD | ...... | EMPLOYMENT | PURCHASE OF RESIDENCE | ...... |
|---|---|---|---|---|---|---|
| YES | YES | NO | | | | |
| NO | NO | NO | | | | |
| NO | NO | NO | | | | |
| YES | NO | NO | | | | |
| YES | NO | NO | | | | |
| YES | NO | NO | | | | |
| YES | NO | NO | | | | |
| .. | .. | .. | .. | .. | .. | .. |

| | RISK RECOGNITION DEGREE | | | | | |
|---|---|---|---|---|---|---|
| DEATH | ACCIDENT-DISASTER | SICKNESS | OLD AGE | LIVING | ...... | |
| 0.5 | 0.6 | 0.6 | 0.5 | 0.7 | | |
| 0.3 | 0.3 | 0.2 | 0.1 | 0.1 | | |
| 0.3 | 0.6 | 0.3 | 0.1 | 0.3 | | |
| 0.4 | 0.5 | 0.4 | 0.2 | 0.7 | | |
| 0.5 | 0.8 | 0.6 | 0.6 | 0.9 | | |
| 0.7 | 0.7 | 0.8 | 0.9 | 0.9 | | |
| 0.9 | 0.6 | 0.9 | 0.7 | 0.8 | | |
| .. | .. | .. | .. | .. | .. | |

FIG. 10E

| | COMPENSATION AMOUNT FOR RISK | | | | |
|---|---|---|---|---|---|
| DEATH | ACCIDENT·DISASTER | | SICKNESS | | ..... |
| DEATH COMPENSATION | DEATH COMPENSATION | HOSPITALIZATION COMPENSATION | 3 SERIOUS SICKNESS | MEDICAL COMPENSATION | ..... |
| ¥50 MILLION | ¥50 MILLION | 15000 | ..... | ..... | |
| ¥10 MILLION | ¥20 MILLION | 5000 | | | |
| ¥5 MILLION | ¥5 MILLION | 5000 | | | |
| ¥30 MILLION | ¥30 MILLION | 10000 | | | |
| ¥5 MILLION | ¥15 MILLION | 5000 | | | |
| ¥100 MILLION | ¥200 MILLION | 20000 | | | |
| : | : | : | : | : | |

FIG. 10F

| COMPENSATION AMOUNT FOR RISK | | | | SUBSCRIBED INSURANCE ARTICLE |
|---|---|---|---|---|
| OLD AGE | | LIVING | ..... | PERMANENT LIFE INSURANCE |
| PERSONAL PENSION | NURSING COMPENSATION | INCOME COMPENSATION | ..... | |
| ..... | ..... | ..... | ..... | ¥5 MILLION |
| | | | | ¥5 MILLION |
| | | | | 0 |
| | | | | ¥2 MILLION |
| | | | | ¥100 MILLION |
| | | | | ¥100 MILLION |
| | | | | : |

FIG. 10G

| SUBSCRIBED INSURANCE ARTICLE | | | | | SIMULATION HISTORY | |
|---|---|---|---|---|---|---|
| TERM INSURANCE | | ANNUITY INSURANCE | | ..... | FIRST SIMULATION RESULT | |
| COMPENSATION AMOUNT | EXPIRATION | ANNUAL AMOUNT RECEIVABLE | PERIOD | | FIRST SIMULATION RESULT | INDIVIDUAL CUSTOMER ATTRIBUTE |
| ¥50 MILLION | 2002 | 0 | 0 | | | |
| 0 | 0 | 0 | 0 | | | |
| ¥50 MILLION | | | | | | |
| .. | | | | | | |

| SIMULATION HISTORY | | | | | | |
|---|---|---|---|---|---|---|
| FIRST SIMULATION RESULT | | | ..... | nTH SIMULATION RESULT | | |
| RISK RECOGNITION | COMPENSATION AMOUNT | INSURANCE DESIGN | | INDIVIDUAL CUSTOMER ATTRIBUTE | RISK RECOGNITION | ..... |
| | | | | | | |

Table 22 / 90:

| ARTICLE NAME | MAIN CONTRACT | | | ... | RESTRICTING CONDITIONS | | | | ... |
|---|---|---|---|---|---|---|---|---|---|
| | PERMANENT | TERM | PERSONAL PENSION | ... | TERM | LIVING COMPENSATION | NURSING | SICKNESS /DISABLEMENT | ... |
| A PERMANENT LIFE INSURANCE | ○ | | | | | | | | |
| B TERM INSURANCE | | ○ | | | ○ | ○ | ○ | ○ | ... |
| C PENSION | | | ○ | | ○ | ○ | | ○ | ... |
| ... | ... | ... | ... | | ... | ... | ... | ... | ... |

Table 94:

| HOSPITALIZATION | ...... | RESTRICTION | | ... |
|---|---|---|---|---|
| | | | | ... |
| ○ | | DEATH COMPENSATION < ¥100 MILLION | | |
| ○ | | DEATH COMPENSATION < ¥200 MILLION | | ... |
| ○ | | | | |
| ... | | | | |

FIG. 12B a1 : CLARIFY ANXIOUS FACTORS WHICH ARE FELT FROM THE PRESENT TIME TOWARD THE FUTURE
a2 : CLARIFY ANXIOUS FACTORS INCLUDED IN RISK SYSTEM
a3 : CLARIFY RISK FACTORS INCLUDED IN ARTICLE PARTS SYSTEM b1 : OLD AGE
b2 : HEALTH
b3 : HOUSEHOLD
b4 : WORK·EMPLOYMENT
b5 : ENVIRONMENTAL PROBLEM
b6 : STOCK PRICE
b7 : INCOME
b8 : NURSING·MEDICAL
b9 : CALAMITY·DISASTER c1 : NATURAL RISK
c2 : SOCIAL RISK
c3 : PERSONAL RISK
c4 : ECONOMICAL RISK
c5 : HOUSEHOLD RISK d1 : AUTOMOBILE COMPENSATION
d2 : INCOME COMPENSATION
d3 : PERSONAL LIABILITY INSURANCE
d4 : HOSPITALIZATION COMPENSATION
d5 : STOCKS
d6 : DEATH COMPENSATION e1 : RISK RECOGNITION
e2 : ASSOCIATE ANXIOUS ITEMS FOR SUBSCRIBER HIMSELF AND SOCIETY WITH FIVE RISKS (NATURE, ECONOMY, SOCIETY, PERSON, AND HOUSEHOLD) ON THE BASIS OF QUESTIONNAIRE ITEMS. (SENSE OF DISTANCE OF RISK)
e3 : ARTICLE COMPENSATION DESIGN
e4 : ASSOCIATE RELEVANT FINANCIAL PARTS FROM ASSOCIATED RISKS. (FOR EXAMPLE, ACCIDENT/HOSPITALIZATION SPECIAL CONTRACT WHEN THEY ARE ASSOCIATED FROM DISASTER, HOSPITALIZATION COMPENSATION SPECIAL CONTRACT WHEN THEY ARE ASSOCIATED FROM HEALTH, ETC.)

FIG.14

24-1 QUESTIONNAIRE/RISK CONVERSION TABLE INFORMATION

| QUESTIONNAIRE ITEMS / RISK SYSTEM | HEALTH | OLD AGE | HOBBY | BREAKAGE | SALE | DAMAGE | ARSON | TRAFFIC ACCIDENT | LARCENY | EARTHQUAKE | FLOOD | TIDAL WAVE | EMPLOYMENT | PRICES | LAND PRICE |
|---|---|---|---|---|---|---|---|---|---|---|---|---|---|---|---|
| PERSONAL RISK | 1 | 1 | 1 | 0 | 0 | 0 | 0 | 0 | 0 | 0 | 0 | 0 | 0 | 0 | 0 |
| HOUSEHOLD RISK | 0 | 0 | 0 | 1 | 1 | 1 | 0 | 0 | 0 | 0 | 0 | 0 | 0 | 0 | 0 |
| SOCIAL RISK | 0 | 0 | 0 | 0 | 0 | 0 | 1 | 1 | 1 | 0 | 0 | 0 | 0 | 0 | 0 |
| NATURAL RISK | 0 | 0 | 0 | 0 | 0 | 0 | 0 | 0 | 0 | 1 | 1 | 1 | 0 | 0 | 0 |
| ECONOMICAL RISK | 0 | 0 | 0 | 0 | 0 | 0 | 0 | 0 | 0 | 0 | 0 | 0 | 1 | 1 | 1 |

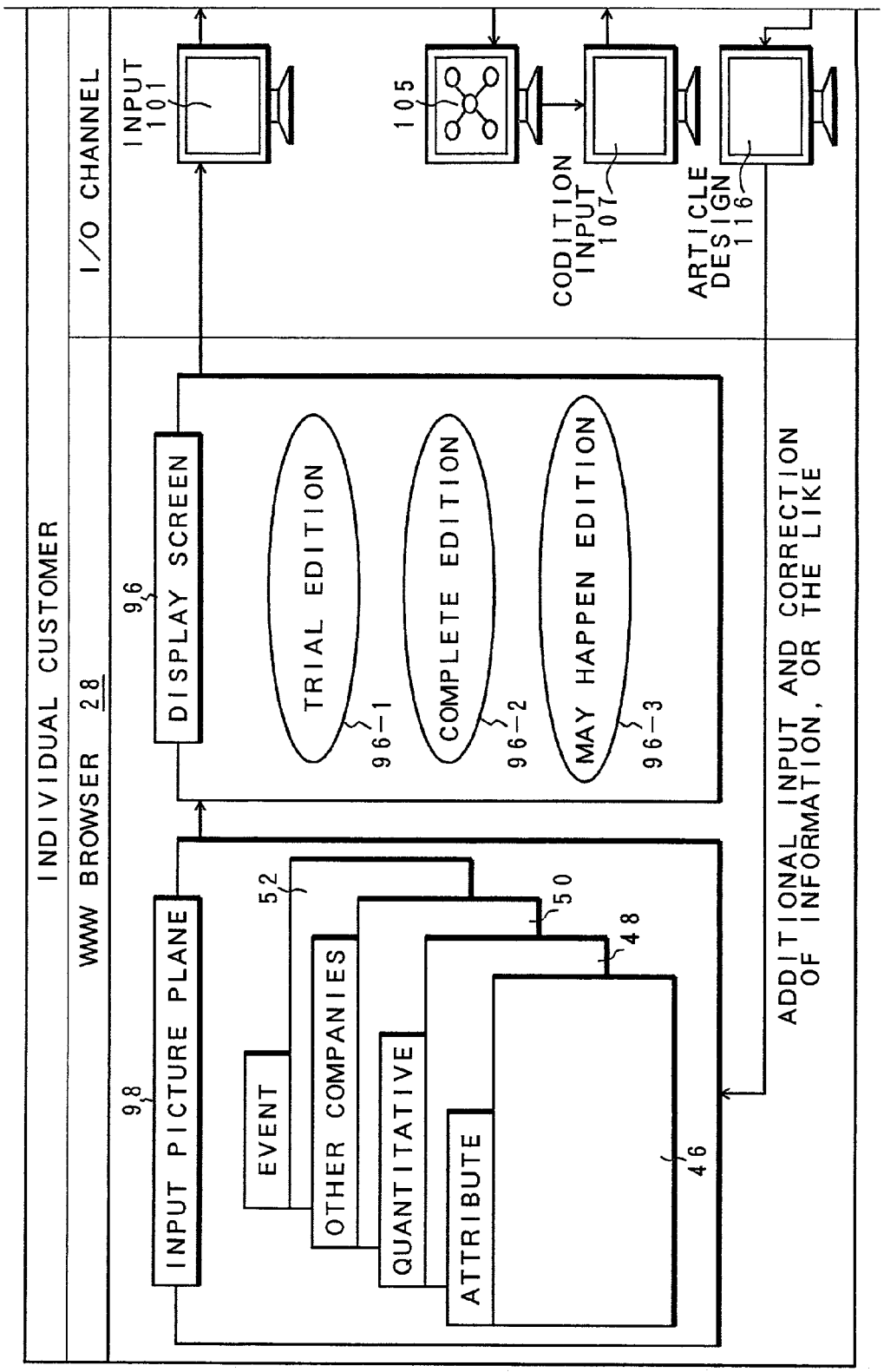

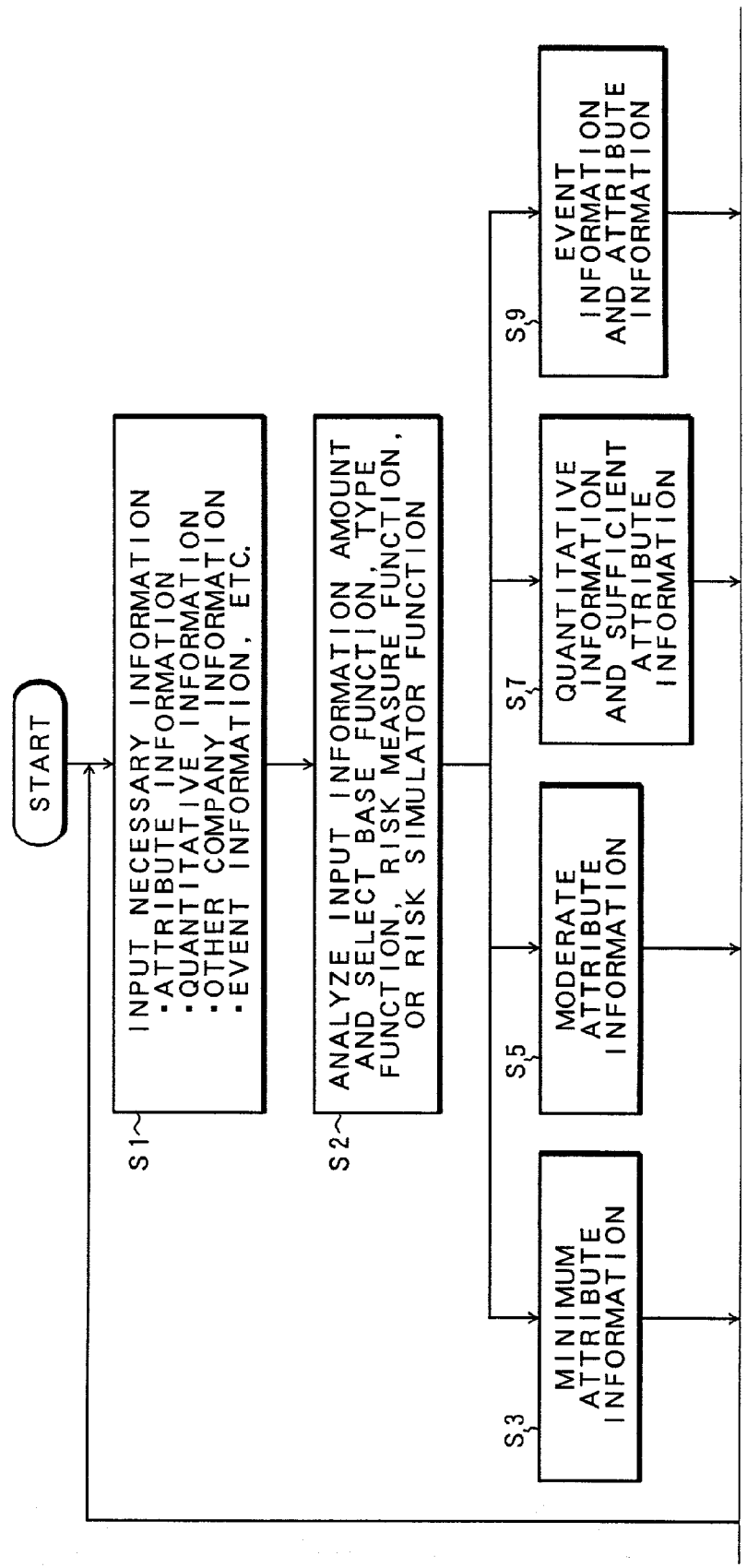

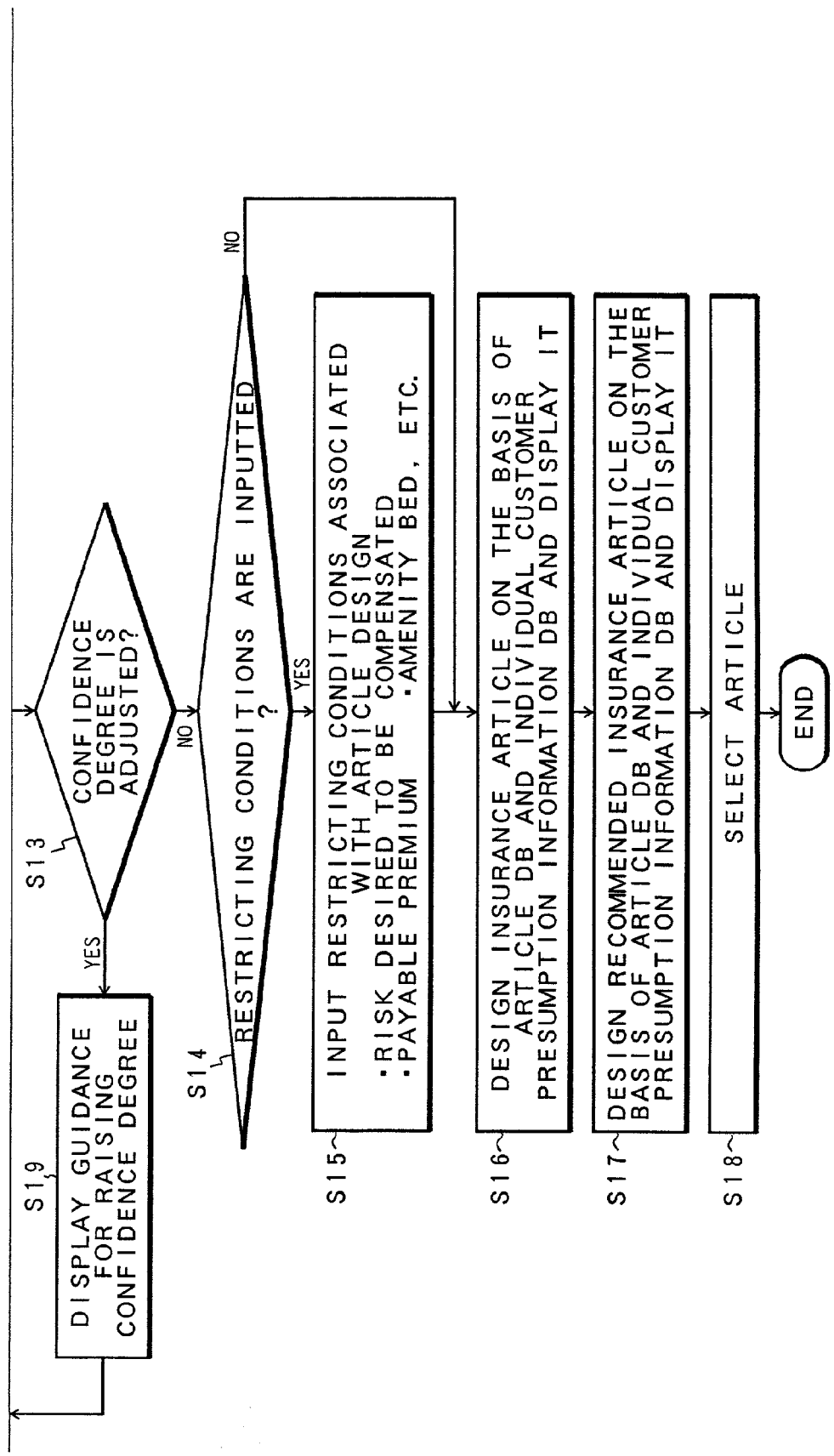

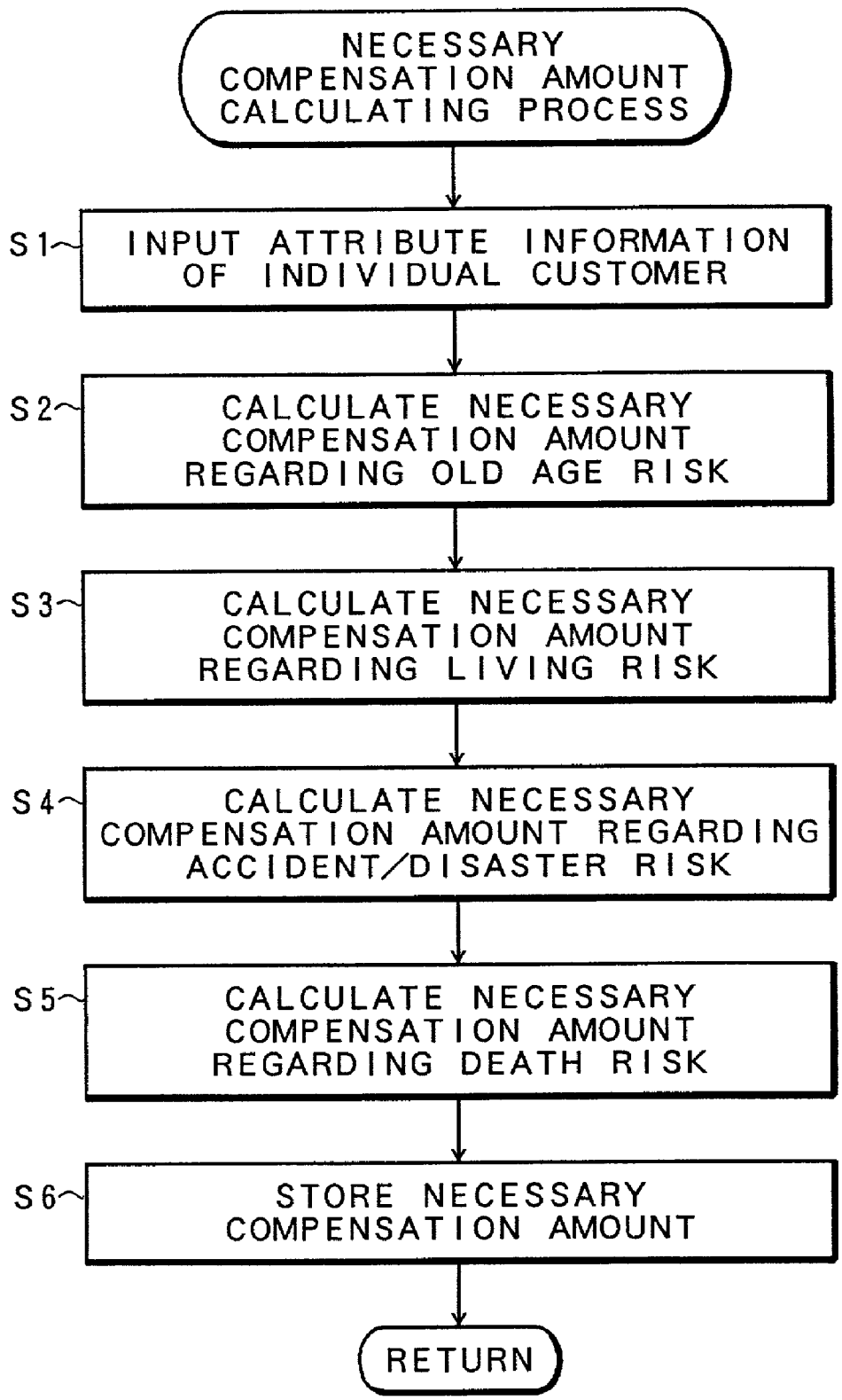

DESIGNING PROGRAM AND METHOD OF FINANCIAL ARTICLE AND RECORDING MEDIUM STORING FINANCIAL ARTICLE DESIGNING PROGRAM

This application is a Continuation-in-part (CIP) of application Ser. No. 09/760,882, filed Jan. 17, 2001, now abandonded.

BACKGROUND OF THE INVENTION

1. Field of the Invention

The invention relates to designing program and method of a financial article for automatically designing the financial article such as an insurance or the like in accordance with needs of an individual customer and to a computer-readable recording medium in which a financial article automatic designing program is stored. More particularly, the invention relates to designing program and method of a financial article for obtaining a necessary compensation amount on the basis of attribute information of an individual customer by converting a recognition degree for a risk of an individual customer into a numerical value and designing an optimum insurance article or the like which satisfies the necessary compensation amount and to a recording medium in which a financial article designing program is stored.

2. Description of the Related Arts

Hitherto, when an insurance is sold by an insurance company, a life plan of an individual customer is presumed at the time of subscription for the insurance and a necessary compensation amount and an insurance article are designed on the basis of the presumed life plan.

As an automatic design of such an insurance article, for example, there is an automatic designing method of an optimum insurance based on an individual life plan disclosed in JP-A-8-237159. According to such a method, an optimum combination of insurance articles such as permanent life insurance, standard flat term insurance, and special contract of a family income insurance is accurately, promptly, and automatically designed on the basis of a life plan which is peculiar to an individual and has been presumed in accordance with an individual life style of the individual.

However, in the insurance article designed on the basis of the individual life plan, uncertainty such as a future life event is included. Even if the article is sold with a consent of the individual customer, there are the following problems:

I. Since consciousness of subscription recognition by the living person himself is not considered, a possibility that an insurance article is designed one-sidedly by the insurance company is high.

II. Since an uncertain future life event is incorporated, a possibility that unnecessary compensation for the future is included is high.

III. Since a future life plan is designed, a large amount of personal qualitative attribute information is necessary.

IV. Since a time base such as a subscription recognition change of the living person is lacking from a time point of subscription, the insurance article can easily become inflexible.

V. In spite of a fact that the insurance is based on the uncertain life event, the living person falls into a delusion that it is the optimum insurance upon subscription.

VI. Since it is complicated to revise the insurance design halfway on the basis of a change in personal life event, a possibility that the compensation includes an excessive surplus amount and a premium is comparatively high is high.

VII. Since the subscription consciousness of the living person himself is not visualized, a possibility that, even if the insurance company explains sufficiently, the person carries insurance without much satisfaction is high.

VIII. Since uncertain events have already been included at the time of subscription, it is difficult for the living person to determine the timing suitable to revise the insurance design.

IX. Since special contracts such as permanent life insurance with term, pension, and the like are one-sidedly proposed by the insurance company, it is hard to know whether the article to be subscribed at present is optimum or not.

X. It is difficult to understand paying conditions for benefit for an accident, a sickness, death, and the like even if the subscriber reads the stipulation.

As for the above problems, since a number of indefinite factors are included in the life plan at the time of subscription, a gap occurs between the life plan and an actual life with the elapse of time. To prevent such a drawback, although a life designing tool for more accurately constructing a life plan exists, it is almost impossible to design an insurance article in which the gap between the life plan and the actual life is eliminated.

SUMMARY OF THE INVENTION

According to the invention, there are provided designing program and method of a financial article, in which when an insurance is designed, a risk for a living person can be objectively understood and the person can carry insurance with satisfaction on the basis of his own judgment, and a recording medium in which a financial article automatic designing program is stored.

According to the invention, there are also provided designing program and method of a financial article, in which at the time of a life event such as marriage, purchase of residence, or the like after subscription, a corresponding insurance can be again properly and easily designed while maintaining an insurance right, and a recording medium in which a financial article automatic designing program is stored.

According to the invention, there is provided a designing program of a financial article, causing a computer to execute:

an information input step for entering information necessary for an insurance;

a risk recognition degree calculating step for calculating a risk recognition degree on the basis of qualitative information such as an anxiety degree and the like indicative of recognition of an individual customer for the risk entered in the information input step, and in the case where a qualitative information is not entered, obtaining qualitative information by searching a database, and calculating a risk recognition degree;

a compensation amount calculating step for calculating a necessary compensation amount for the risk recognized by the individual customer or a necessary compensation amount based on attribute information of the individual customer;

an output displaying step for outputting and displaying the risk recognition degrees and the necessary compensation amounts; and an article designing step for designing an optimum insurance article which satisfies the necessary compensation amounts for the risk displayed in the output displaying step and provides the same.

The individual steps of this program, in terms of an equipment configuration, are as follows. More specifically, they comprise: an information input unit which inputs information necessary for an insurance; a risk recognition degree calculating unit which calculates a risk recognition degree on the basis of qualitative information such as an anxiety degree and the like showing recognition of an individual customer for a risk entered from the information input unit and, when the qualitative information is not entered, obtains qualitative information by searching a database and calculates a risk recognition degree; a compensation amount calculating unit which calculates a necessary compensation amount for the risk recognized by the individual customer (it means the same as a customer) or a necessary compensation amount based on attribute information of the individual customer; an output display unit which outputs and displays the risk recognition degree and the necessary compensation amount; and an article designing unit which designs and provides an optimum insurance article which satisfies the necessary compensation amount for the risk displayed by the output display unit.

The database which is used in the invention has an individual customer presumption information database, a personal database, and a conversion table. In the individual presumption information database, there have been stored: individual example information constructed by attribute information of the individual customer, qualitative information, a risk recognition degree, a necessary compensation amount for the risk, and a insurance article; and example information per segment constructed by attribute information, qualitative information, a risk recognition degree, a necessary compensation amount for the risk, and an insurance article each of which has been segmented by a predetermined category. Individual customer information constructed by attribute information of the individual customer, quantitative information, a risk recognition degree, a necessary compensation amount for the risk, and an insurance article has been stored per individual customer in the personal database. Questionnaire/risk conversion table information which defines a correlation between risk items serving as qualitative information for questionnaire items of the individual customer and the risk recognition degree and risk/insurance parts conversion table information which defines a correlation between the insurance articles for the risk items and the necessary compensation amounts are stored in the conversion table. The risk recognition degree calculating unit obtains the risk recognition degrees corresponding to the qualitative information from the conversion table and allows them to be displayed by the output display unit. At the same time, the compensation amount calculating unit extracts the necessary compensation amounts corresponding to the risk items from the conversion table and allows them to be displayed by the output display unit. Further, the financial article automatic designing apparatus according to the invention reflects the storage information in the personal database to the individual customer presumption information database at a predetermined timing. As mentioned above, according to the invention, the risk recognition degree is obtained by a similarity search of the individual customer presumption information database using the qualitative information (psychographic data) showing the anxiety degree of the individual customer for the risk or from the conversion table, and the necessary compensation amount is obtained by a search of the individual customer presumption information database using the attribute information (demographic data) or from the conversion table. By visualizing and displaying them, a difference between an actually existing risk and a potential risk can be grasped, the compensation contents of an insurance to be carried can be judged by the customer himself, and an insurance subscription consciousness as a living person is clarified. By satisfying the risk items of (including a designation by the living person himself) the high risk recognition degrees and the necessary compensation amount thereof, an optimum insurance article as preparation for the present risk recognition degree can be designed.

The financial article automatic designing apparatus of the invention further comprises an information analyzing function unit which selects a designing function in accordance with a degree of information entered by the individual customer and allows the selected function to be displayed by the output display unit. In this case, the selecting functions are classified into the following three functions.

(Risk Measure Function)

According to the financial article automatic designing apparatus of the invention, when the quantitative information and attribute information of the individual customer are entered by the information input unit, the risk recognition degree calculating unit and compensation amount calculating unit calculate a risk recognition degree and a necessary compensation amount by the conversion table and allow them to be displayed by the output display unit.

(Type Function)

In the case where only the attribute information of the individual customer is entered by the information input unit, the risk recognition degree calculating unit extracts the risk recognition degree by a similarity search of the individual customer presumption information database according to the entered attribute information and allows it to be displayed by the output display unit. At the same time, the compensation amount calculating unit obtains the necessary compensation amount by the conversion of the risk by the conversion table or the similarity search of the individual customer presumption information database according to the entered attribute information and allows it to be displayed by the output display unit. As mentioned above, according to the invention, even if the qualitative information showing an anxiety degree for the risk is not entered, the qualitative information is compensated by the search of the database, so that the risk recognition degree and the necessary compensation amount for the risk can be presented to the individual customer merely by entering the attribute information of the individual customer.

(Base Function)

Further, in the case where only a part of the attribute information is entered by the information input unit, the risk recognition degree calculating unit compensates the lacking attribute information by the similarity search of the individual customer presumption information database by the entered partial attribute information, extracts the risk recognition degree, and allows it to be displayed by the output display unit. At the same time, the compensation amount calculating unit obtains the necessary compensation amount by the similarity search of the individual customer presumption information database and allows it to be displayed by the output display unit. Therefore, even in the case where only a small part of the attribute information such as sex and date of birth can be entered, the risk recognition degree and necessary compensation amount can be presented to the individual customer every risk while compensating the lacking information by searching the database.

(Confidence Degree)

The compensation amount calculating unit of the financial article automatic designing apparatus according to the invention calculates a confidence degree of the necessary compensation amount on the basis of a ratio of the number of inputs from the individual customer to the total number of attribute information and a weight of input items and allows it to be displayed by the output display unit together with the risk recognition degree and necessary compensation amount. By showing the confidence degree calculated in accordance with the ratio of the attribute information entered by the user as mentioned above, suitability of the necessary compensation amount for the risk can be recognized.

(Numerical Value of Risk Recognition Degree)

In the invention, the risk recognition degree which is calculated is set to a value which is inversely proportional to a magnitude of the risk recognition degree and lies within a range of, for example, 0 to 1. The qualitative information which is entered by the information input unit is answer information of questionnaire information in which the degree of anxiety of the individual customer for the risk is expressed by a plurality of stages. For example, it is set to the information obtained by selecting one of questionnaire information of four stages such as "very anxious", "slightly anxious", "not very anxious", and "not anxious".

(Map Display)

The output display unit outputs and displays a map image in which the risk recognition degree is expressed by a distance of a branch extending from a center and the necessary compensation amount is expressed by an area of a figure using a circle, an ellipse, or the like arranged at the end of the branch. From the length of branch showing the risk recognition degree and the area of, for example, the circle at the end of the branch showing the necessary compensation amount, the individual customer can visually grasp the relation between his own risk recognition degree and the necessary compensation amount and can judge the contents of the insurance to be subscribed by himself.

(Table Format)

The output display unit also outputs and displays the risk recognition degrees and the compensation amounts by a table format in order from the higher risk. Therefore, the individual customer can judge the contents of the insurance to be subscribed by himself in order from higher priority of the risk.

(Comparison Display)

Further, in the case where the existing contract information is obtained from the information input unit or database, the output display unit comparison displays the risk recognition degree and the necessary compensation amount of the existing contract information onto the map image of the risk recognition degrees and necessary compensation amounts displayed at present. Thus, a difference of the necessary compensation amounts can be understood by a difference of the sizes of the circles of the risk items, so that missing of the subscription of the existing contract, a high necessary compensation amount, contrarily, a shortage of the necessary compensation amount, and the like can be properly judged on the basis of the difference between both of them. The insurance contents to be recombined can be judged by himself with respect to the existing contract.

(Risk Simulator Function)

According to the financial article automatic designing apparatus of the invention, in the case where event information such as marriage, entrance into school, purchase of residence, and the like is entered from the information input unit after the insurance article was designed, the risk recognition degree and necessary compensation amount of each risk are obtained by the risk recognition degree calculating unit and the compensation amount calculating unit on the basis of the event information and displayed by the output display unit. Therefore, the insurance design can be easily revised halfway on the basis of a change in life event of the individual, and the insurance article can be revised or recombined properly in correspondence to the risk change.

(Insurance Design)

The article designing unit of the invention designs the insurance article again so as to satisfy the difference amount between the calculated necessary compensation amount per risk and the present compensation amount or resets the present insurance article and newly designs an insurance article which satisfies the necessary compensation amount per risk. Therefore, the design and recombination of the insurance article including the existing contract can be easily performed. Further, the article designing unit designs and displays a recommended insurance article which almost satisfies the necessary compensation amount for the risks of the individual customer by slightly changing, for example, restricting conditions or the like of the individual customer.

(General Financial Articles)

Further, the invention is not limited to the insurance article but can be applied to financial articles such as investment trust, stocks, saving, and the like as targets and comprises: an information input unit which inputs information necessary for designing a financial article; a risk recognition degree calculating unit which calculates a risk recognition degree on the basis of quantitative information showing an anxiety degree of an individual customer for the risk; a necessary amount calculating unit which calculates a necessary amount of the financial article for the risk recognized by the individual customer or a necessary amount of the financial article based on attribute information of the individual customer and presents it; an output display unit which visualizes the risk recognition degree and the necessary amount of the financial article and presents them to the individual customer; and an article designing unit which designs and presents an optimum financial article which satisfies the necessary amount of the financial article presented by a risk correspondence processing unit.

(Method)

According to the invention, there is provided a financial article automatic designing method, comprising:

an information input step which inputs information necessary for an insurance;

a risk recognition degree calculating step which calculates a risk recognition degree on the basis of qualitative information such as an anxiety degree and the like showing a recognition of the individual customer for the risk entered by the information input step, and when the qualitative information is not entered, obtains qualitative information by searching a database, and calculates a risk recognition degree;

a compensation amount calculating step which calculates a necessary compensation amount for the risk recognized by the individual customer or a necessary compensation amount based on attribute information of the individual customer;

an output display step which outputs and displays the risk recognition degrees and the necessary compensation amounts; and an article designing step which designs an optimum insurance article which satisfies the necessary compensation amounts for the risks displayed by the output display step and provides it.

The details of the automatic designing method are substantially the same as those in the case of the apparatus construction.

(Medium)

According to the invention, there is provided a recording medium in which an automatic designing program of a financial article is stored, wherein the automatic designing program comprises the steps of:

entering information necessary for an insurance;

calculating a risk recognition degree on the basis of entered qualitative information such as an anxiety degree and the like showing a recognition of the individual customer for the risk, and when the quantitative information is not entered, obtaining qualitative information by searching a database and calculating a risk recognition degree;

calculating a necessary compensation amount for the risk recognized by the individual customer or a necessary compensation amount based on attribute information of the individual customer;

outputting and displaying the risk recognition degrees and the necessary compensation amounts; and designing an optimum insurance article which satisfies the necessary compensation amounts for the risks which were output and displayed and providing it.

The above and other objects, features, and advantages of the present invention will become more apparent from the following detailed description with reference to the drawings.

BRIEF DESCRIPTION OF THE DRAWINGS

FIGS. 3A to 3D are explanatory diagrams of input information in FIGS. 2A and 2B;

FIG. 5 is an explanatory diagram of a display by a table format of the risk recognition degrees and the necessary compensation amounts calculated according to the invention;

FIGS. 6A to 6C are explanatory diagrams of an individual customer presumption information database, a personal database, and an insurance article database in FIGS. 2A and 2B;

FIGS. 7A to 7G are explanatory diagrams of individual example information stored in the individual customer presumption information database in FIGS. 2A and 2B;

FIGS. 8A to 8C are explanatory diagrams of example information per segment stored in the individual customer presumption information database in FIGS. 2A and 2B;

FIGS. 9A to 9D are explanatory diagrams of the example information per segment sequel to FIGS. 8A to 8C;

FIGS. 10A to 10H are explanatory diagrams of the personal database in FIGS. 2A and 2B;

FIG. 11 is an explanatory diagram of the insurance article database in FIGS. 2A and 2B;

FIG. 14 is an explanatory diagram of questionnaire/risk conversion information provided for a conversion table in FIGS. 2A and 2B;

FIGS. 16A and 16B are explanatory diagrams of the whole flow of an insurance design according to the invention;

FIGS. 19A to 19C are flowcharts for an insurance automatic designing process of the invention;

FIG. 22 is a flowchart for a necessary compensation amount calculating process in a type function process, the risk measure function process, and risk simulator function process in FIGS. 19A to 19C.

DETAILED DESCRIPTION OF THE PREFERRED EMBODIMENT

Figure 1:
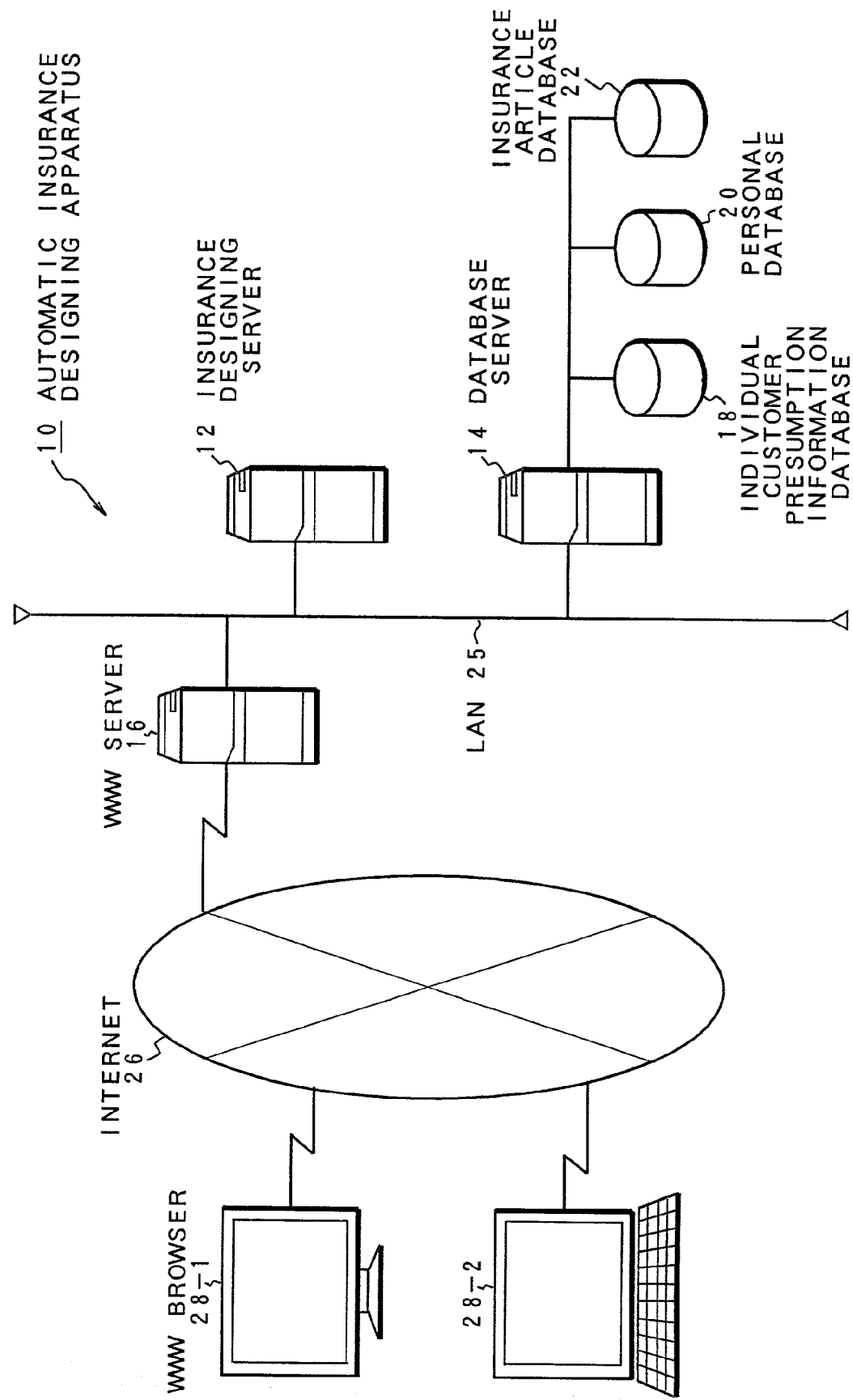
FIG. 1 is an explanatory diagram of a network construction to which the invention is applied.

FIG. 1 shows a hardware construction of a financial article automatic designing apparatus of the invention and relates to an example of a case of a network construction. An automatic design of an insurance article is shown as an example of an financial article. An automatic insurance designing apparatus 10 is constructed by a WWW server 16 which functions as an application server, a database server 14, and an insurance designing server 12 and each server is connected by an LAN 25. An individual customer presumption information database 18, a personal database 20, and an insurance article database 22 are connected to the database server 14. The insurance designing server 12 transmits and receives information to/from WWW browsers 28-1 and 28-2 on the individual customer side connected to an Internet 26 via the WWW server 16. Therefore, the WWW browsers 28-1 and 28-2 become user interfaces on the individual customer side of the automatic insurance designing apparatus 10 according to the invention.

Figure 2A:
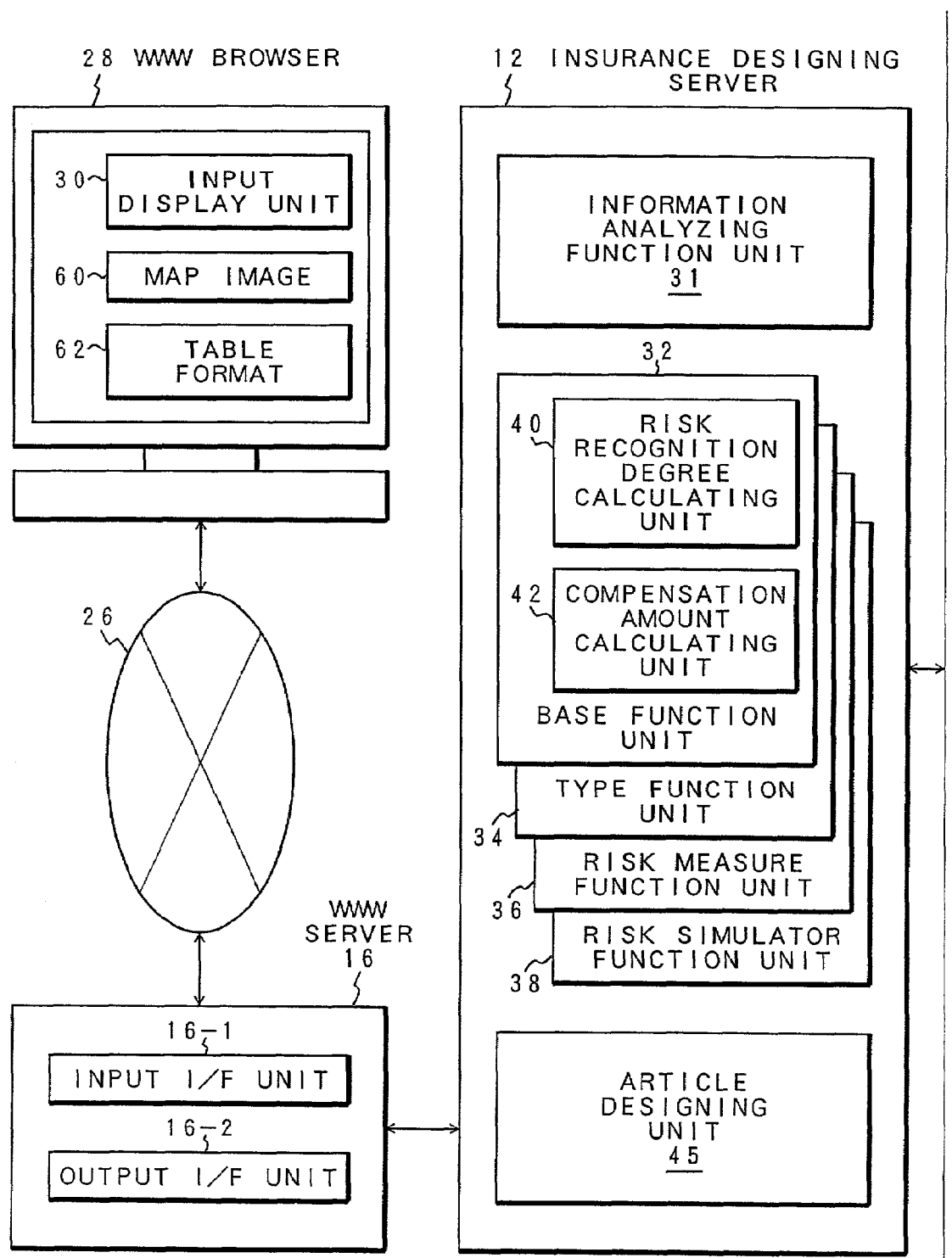
FIGS. 2A and 2B are block diagrams of a functional construction of the invention.
Figure 2B:
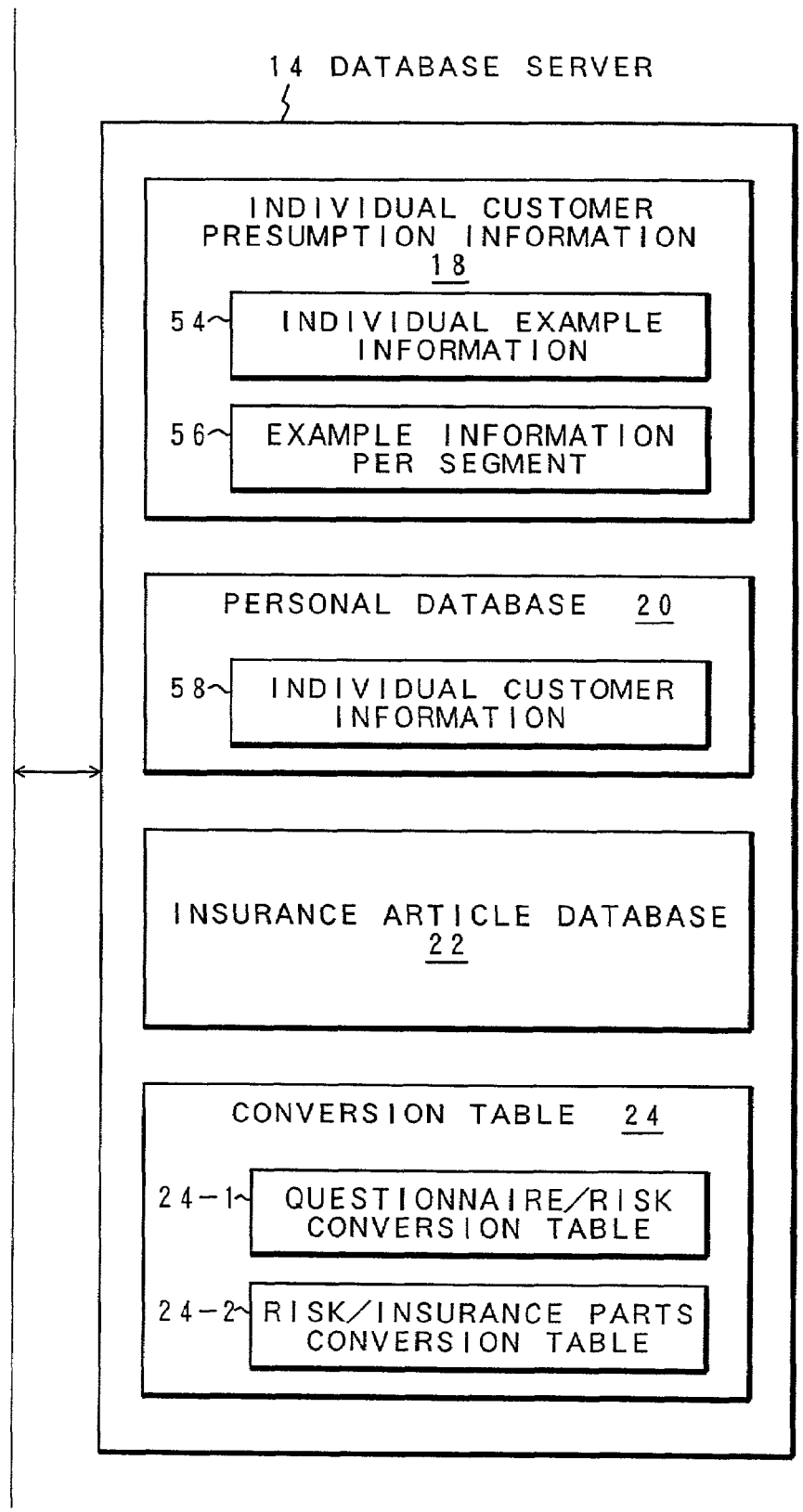

FIGS. 2A and 2B are block diagrams of a functional construction of the automatic insurance designing apparatus 10 in FIG. 1. A WWW browser 28 serving as an apparatus on the individual customer side comprises: an input display unit 30 for entering attribute information and qualitative information of the individual customer; and display units of a map image 60 and a table format 62 for outputting and displaying risk recognition degrees and necessary compensation amounts, respectively. An input interface unit 16-1 which functions as an information input unit and an output interface unit 16-2 which functions as an output display unit are provided for the WWW server 16 for connecting the WWW browser 28 via the Internet 26. The insurance designing server 12 which operates as an application server for insurance automatic design has: an information analyzing function unit 31; a base function unit 32; a type function unit 34; a risk measure function unit 36; a risk simulator function unit 38; and an article designing unit 45. The information analyzing function unit 31 selects the design function of one of the base function unit 32, type function unit 34, risk measure function unit 36, and risk simulator function unit 38 in accordance with a degree of the information entered by the individual customer and displays the selected function onto a screen of the WWW browser 28. As representatively shown by the base function unit 32, among the base function unit 32, type function unit 34, risk measure function unit 36, and risk simulator function unit 38, a risk recognition degree calculating unit 40 and a compensation amount calculating unit 42 are provided. By downloading an applet for the insurance automatic design from the WWW server 16 to the WWW browser 28 of the individual customer, the input display unit 30 is provided. By using the input display unit 30 on the browser, attribute information, quantitative information, another company contract information, and event information of the individual costumer are entered to the insurance designing server 12 via the input I/F unit 16-1 of the WWW server 16 as necessary. The attribute information is personal information of the individual customer and, for example, individual customer attribute information 46 as shown in FIG. 3A is entered. The individual customer attribute information 46 has "sex", "date of birth", "region of residence", "occupation", "marital status", "annual income", as attribute items, and social and economical personal information such as "saving amount", "family construction", and the like are also included in addition to the above items. One of the head items "sex" and "data of birth" among the attribute items of the individual customer attribute information 46 is the minimum fundamental attribute information necessary for the insurance design of the invention. If one of the fundamental attribute information is obtained, the insurance design according to the invention can be performed by compensating the other attribute information by searching the database. The attribute information 46 of the individual customer as mentioned above can be regarded as demographic data of the individual customer. Qualitative information 48 is information such as an anxiety degree and the like showing the recognition of the individual customer for the risk. In other words, it can be regarded as psychographic data indicative of the way of thinking, personality, or the like of the individual customer for the risk. According to the invention, the qualitative information in an questionnaire format as shown in FIGS. 3A to 3D is entered as qualitative information 48. The qualitative information 48 defines risk items ("death", "accident disaster", "sickness", "old age", "living", "inflation", etc.). With respect to each risk item, the anxiety degree of the individual customer is divided into four stages such as "very anxious", "slightly anxious", "not very anxious", "not anxious" as recognition for the risk. Obviously, as recognition for the risk in the qualitative information 48, for example, the anxiety degree can be divided into two stages of "anxious" and "not anxious" or into a plurality of stages more than four stages. For simplicity of the explanation, five items "death", "accident disaster", "sickness", "old age", and "living" are used as examples of the risk items here. The entered attribute information 46 and qualitative information 48 are used for calculating a risk recognition degree by the risk recognition degree calculating unit 40 provided for each of the base function unit 32, type function unit 34, risk measure function unit 36, and risk simulator function unit 38, and also used for calculating a necessary compensation amount for the risk by the compensation amount calculating unit 42 if necessary. Subsequently, as information entered by the information input unit 30, there is other company contracted information 50. As shown in FIG. 3C, the other company contracted information 50 is information regarding an insurance contract of another company and information regarding an insurance contract of the self company which has already been contracted. A compensation amount, a premium, contents of maturity special contract compensation, or the like is entered as an insurance kind in the other company contracted information 50 every kind of insurance separately with respect to a main contract and the special contract. Finally, event information 52 is information for setting "yes", "no", or the like of an event during the life after the insurance article was designed. By entering the event information, it is used for recalculation of the risk recognition degree and necessary compensation amount again and the redesign of the optimum insurance article due to the occurrence of the event after the insurance was designed. The event information 52 is constructed by event items and their contents as shown in FIG. 3D. As event items, there are "marriage", "birth of first child", "birth of second child", "purchase of residence", and the like and "yes" or "no" is set in correspondence to each event item. The event items in which "yes" has been set are handled as event input information.

Referring again to FIGS. 2A and 2B, each of the base function unit 32, type function unit 34, risk measure function unit 36, and risk simulator function unit 38 provided for the insurance designing server 12 calculates the risk recognition degree by the risk recognition degree calculating unit 40 on the basis of the input information from the individual customer, calculates the necessary compensation amount by the compensation amount calculating unit 42, and displays the risk recognition degree and compensation amount onto the WWW browser 28 of the individual customer by the map image 60 and/or the table format 62.

Figure 4:
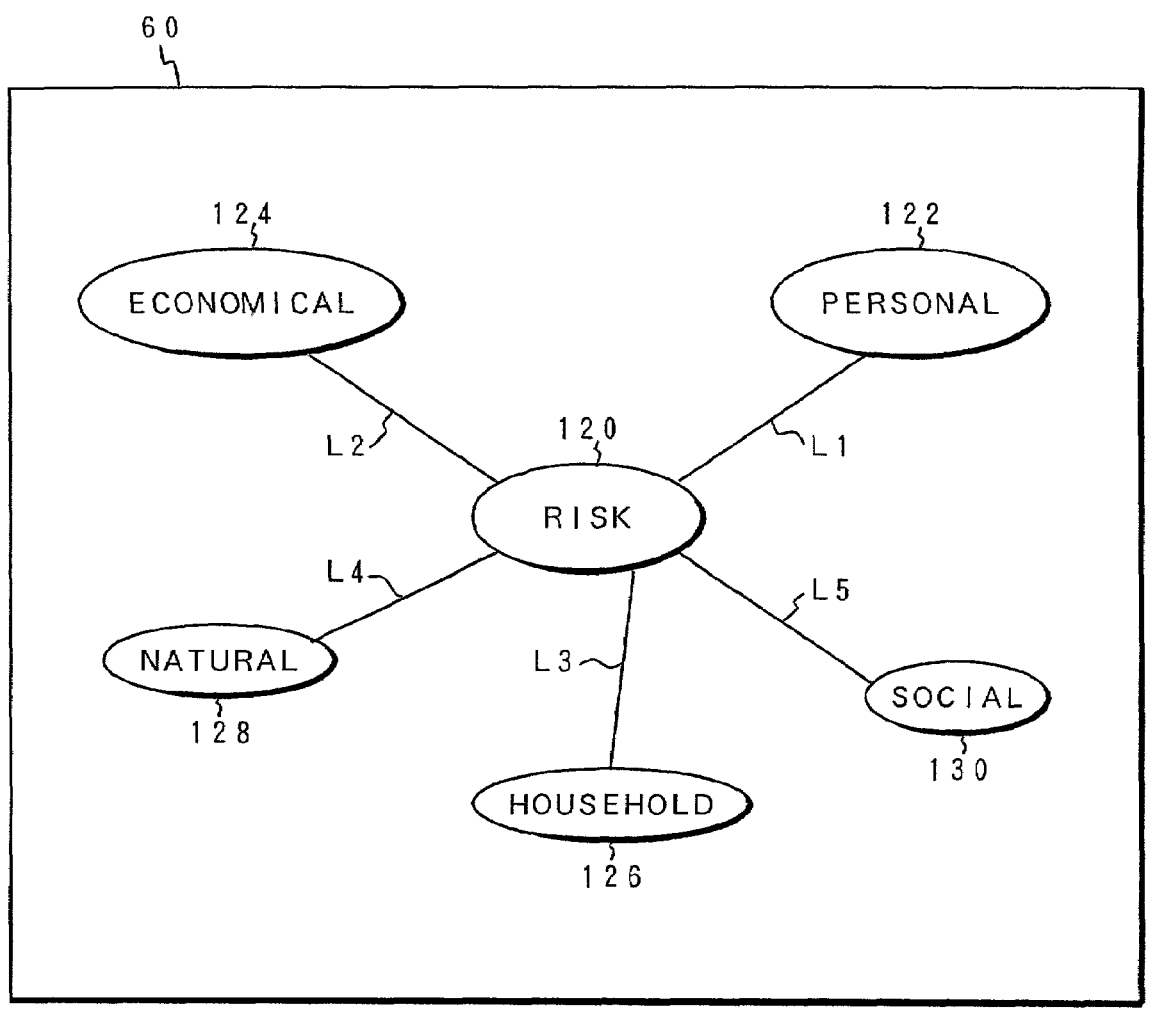
FIG. 4 is an explanatory diagram of a display by a map format of risk recognition degrees and necessary compensation amounts calculated according to the invention.

FIG. 4 shows an example of the map image 60 of the risk recognition degrees of the individual customer and the necessary compensation amounts for the risks calculated by the insurance designing server 12. The map image 60 displays the risk recognition degrees of the individual customer and the necessary compensation amounts by classifying the risk into five risk systems such as personal risk, economical risk, household risk, natural risk, and social risk. The risk items of death, accident disaster, old age, living, and the like shown in the databases in FIGS. 7A to 10H are classified into the five risk systems and this classification is performed in accordance with a correlation of a questionnaire/risk conversion table 24-1, which will be clearly explained hereinafter. First, the risk recognition degree of the invention calculated by the risk recognition degree calculating unit 40 denotes a value obtained by converting the risk recognition degree into a numerical value on the basis of the qualitative information indicative of the anxiety degree of the individual customer for the risk. The risk recognition degree lies within a range of, for example, 0 to 1. The higher the risk is, the smaller the value is, and the lower the risk is, the larger the value is. The recognition degrees calculated as mentioned above are shown by lengths L1, L2, L3, L4, and L5 of branches extending outwardly from a center 120 in the map image 60 in FIG. 4. In this case, the lengths of branches are set to be longer in order of L1, L2, L3, L4, and L5, the anxiety degree of the personal risk of the shortest length L1 is the largest, and the anxiety degrees of the risks decrease in order of L2, L3, L4, and L5. The necessary compensation amounts of the risks are shown at the edges of the branches having the lengths L1 to L5 corresponding to the risk recognition degrees by sizes of areas of ellipses in the embodiment. In this case, a personal risk compensation amount 122 is the largest and subsequently, an economical risk compensation amount 124, a household risk compensation amount 126, and a natural risk compensation amount 128 follow, and a social risk compensation amount 130 is the smallest. By viewing the map image 60 in which the risk recognition degrees and necessary compensation amounts are expressed as mentioned above, it will be understood that the anxiety degree for the risk of the individual customer is higher as the compensation amount of the size shown by the ellipse approaches the center 120 and the anxiety degree is lower as the compensation amount is far from the center 120. It can be intuitively grasped that, with respect to the risk near the center 120, as the area of the ellipse is large, the recognition degree of the individual customer and the necessary compensation amount are high.

FIG. 5 shows risk recognition degrees and necessary compensation amounts displayed on the WWW browser 28 in FIGS. 2A and 2B by the table format 62 and corresponds to the map image 60 in FIG. 4. In the table format 62, the risk recognition degrees are arranged in accordance with priorities 1 to 5. The risk items, necessary compensation amounts, and monthly premiums are displayed with respect to each priority. However, the premium is not limited to the monthly display. Further, a confidence degree based on the attribute information of the individual customer of the calculated necessary compensation amount is displayed as, for example, a confidence degree 50%. A value of the confidence degree for the necessary compensation amount is shown by a ratio of the number of items which were actually entered by the individual customer to the total number of input items of the attribute information and by weights to the input items. For example, "confidence degree 50%" denotes a case where the half of the input items of the attribute information necessary for the insurance design are entered by the individual customer and the other items are formed on the automatic designing apparatus side or are not used. Therefore, as the number of input items of the attribute information from the individual customer increases, a percentage showing the confidence degree of the necessary compensation amount increases. Since the confidence degree is raised when the individual customer inputs the necessary attribute information, according to the invention, upon output display, an input of the attribute information necessary for raising the confidence degree is displayed as a guidance.

Each of the base function unit 32, type function unit 34, risk measure function unit 36, and risk simulator function unit 38 provided for the insurance designing server 12 in FIGS. 2A and 2B will now be explained. As for the base function unit 32, type function unit 34, risk measure function unit 36, and risk simulator function unit 38, the information analyzing function unit 31 analyzes the number, kind, and the like of the input information, selects the function, and displays a selection result onto the WWW browser 28. Selecting functions in this case are summarized as follows.

(Base function Unit 32)

The unit 32 operates when minimum necessary information in the attribute information 46, for example, only the fundamental attribute information such as "sex" and/or "date of birth (age)" is entered, and provides a fundamental model in which risk characteristics per fundamental attribute are taken into consideration of. The fundamental model is utilized as an opportunity to draw the needs of the individual customer.

(Type Function Unit 34)

The unit 34 operates when the attribute information such as "occupation", "income", and the like is further entered in addition to "sex" and/or "date of birth" as fundamental attribute information and grasps the risk characteristics per type of individual customer. This function provides a risk model per individual customer type and, in more details, it is utilized when drawing the needs of the individual customer, an actually existing risk, and a potential risk.

(Risk Measure Function Unit 36)

The unit 36 grasps the risk of a high confidence degree at a present time point on the basis of the quantitative information and the input of the sufficient attribute information, and provides a risk evaluation model. Therefore, it is used when forming an insurance design which is optimum for the individual customer. With respect to the input information, it is necessary to input the fundamental information such as "sex", "age", and the like in the attribute information 46 or information (occupation, income, etc.) which each person has in addition to the qualitative information 48.

(Risk simulator Function Unit 38)

The unit 38 provides a risk change model in which a change in management consciousness of the individual customer for the future event, namely, a change in risk or needs is grasped. The model is used for revising the optimum insurance after the insurance was designed.

As for the operations of the base function unit 32, type function unit 34, risk measure function unit 36, and risk simulator function unit 38 provided for the insurance designing server 12 mentioned above, the information analyzing function unit 31 analyzes by the kind and number of input information of the individual customer by the WWW browser 28, selects the corresponding function unit, makes it operative, calculates the risk recognition degree and the necessary compensation amount for the risk, and allows them to be displayed on the WWW browser 28 by the map image 60 as shown in FIG. 4 or the table format 62 as shown in FIG. 5. The output I/F unit 16-2 of the WWW browser 28 which functions as an output display unit forms the map image 60 in FIG. 4 and the table format 62 in FIG. 5 on the basis of the risk recognition degrees and necessary compensation amounts calculated by the base function unit 32, type function unit 34, risk measure function unit 36, and risk simulator function unit 38, provides them to the WWW browser 28, and allows them to be displayed on the display. On the basis of the risk items of the individual customer and the selection result of the necessary compensation amounts based on the display result of the map image 60 and/or table format 62 on the WWW browser 28, the article designing unit 45 designs the optimum insurance article which satisfies the necessary compensation amounts by referring to the insurance article database 22 and allows it to be displayed on the WWW browser 28 by the output interface unit (output display unit) 16-2. As for the design of the insurance article by the article designing unit 45, the insurance article is designed again so as to satisfy a difference between the calculated necessary compensation amount per risk and the present compensation amount or the present insurance article is reset and an insurance article which satisfies the necessary compensation amount per risk is newly designed. Further, the article designing unit 45 performs a display to provide a recommended article on the basis of a decision of the apparatus itself. For example, the unit 45 calculates the optimum risk recognition degree and necessary compensation amount on the assumption that the individual customer adds some amount to the monthly amount of the insurance payment set as a subscribing condition (restricting condition), designs an insurance article which satisfies the necessary compensation amount, and allows it to be displayed as a recommended insurance article.

In order to perform such an insurance designing process by the insurance designing server 12, the individual customer presumption information database 18, personal database 20, insurance article database 22, and a conversion table 24 are provided for the database server 14. First, individual example information 54 and example information per segment 56 are provided for the individual customer presumption information database 18. FIG. 6A shows a construction of the individual example information 54 in the individual customer presumption information database 18, in which one record is provided for one person. The information 54 includes individual customer attribute information 64, individual customer qualitative information 65, a risk recognition degree 66, a compensation amount 68, a subscribed insurance article 70, and a simulation history 72. The simulation history 72 is constructed by individual customer attribute information, qualitative information, a risk recognition degree, a compensation amount, and a subscribed insurance article. The example information per segment 56 is information in which one record is provided for one segment in accordance with a classification of predetermined segments such as "sex" and "per age" in the attribute information. The information 56 is obtained by replacing the attribute information 64 at the head in FIG. 6A with segment information. The individual example information 54 and example information per segment 56 are formed by reflecting the individual customer information 58 which has already been designed in the personal database 20 at a predetermined timing. FIGS. 7A to 7G show specific examples of the individual example information 54 stored in the individual customer presumption information database 18 in FIGS. 2A and 2B. The individual example information 54 is constructed by the individual customer attribute information 64, individual customer qualitative information 65, risk recognition degree 66, compensation amount 68 for the risk, subscribed insurance article 70, and simulation history 72. The information such as "sex", "age", and the like are stored in the individual customer attribute information 64 and classified. The individual customer qualitative information 65 stores the contents of the qualitative information 48 entered via the input interface 16-1 as information input unit for each individual example with respect to each of "death", "accident disaster", "sickness", "old age", and "living" as risk items. The risk recognition degree 66 is a numerical value of the risk recognition degree about each of the risk items calculated from the individual customer qualitative information 65 and numerical values in a range of 0 to 1 have been stored. With respect to the risk items of "death", "accident disaster", "sickness", "old age", and "living", in the compensation amount 68 for the risk, an insurance amount is stored every individual, f or example, as shown in the risk item "death". In this case, since the compensation amount only of the death compensation is shown as an example, the compensation amount in the same risk item "death" has been stored with respect to the death compensation in the risk item of "accident disaster". Further, the subscribed insurance article 70 has "permanent life insurance", "term insurance", and "annuity insurance" as kinds of subscribed insurance in the individual example. In this example, the amounts of the compensation amounts 68 for the risks are stored with respect to "permanent life insurance". The contents of "term insurance" are divided into "compensation amount" and "period", and the contents of "annuity insurance" are divided into "annual amount receivable" and "period". In the simulation history 72 at the end, the items of the individual customer attribute, risk recognition degree, compensation amount, insurance design, and the like are provided as "nth simulation result" obtained by entering the event information 52.

FIGS. 8A to 8C and FIGS. 9A to 9C show specific examples of the example information per segment 56 provided for the individual customer presumption information database 18 in FIGS. 2A and 2B. That is, FIGS. 8A and 9A show example information per sex 56-1 in which "sex" as one of the individual customer attribute information is used as a segment and it is converted to the risk recognition degree of each risk item. The risk recognition degree, the compensation amount for the risk, and the like are separately stored with respect to the segments of "male" and "female". FIGS. 8B and 9B show example information per age 56-2 in which the compensation amount for the risk recognition degree and the like have been stored by using "age" in the individual customer attribute information as a segment. That is, "age" as a segment serving as individual customer attribute information is divided into "20", "21-29", "30-39", "40-49", "50-59", and "60", and the risk recognition degree is classified into the risk items of "death", "accident disaster", "sickness", "old age", and "living" every age and stored. Further, FIGS. 8C and 9C show example information per sex/age 56-3. "sex" and "age" as fundamental attribute information in the attribute information 46 are used as the segments. The sex is divided into "male" and "female", each sex is divided into "20", "21-29", "30-39", "40-49", "50-59", and "60". The risk recognition degree, the compensation amount for the risk, and the like are stored every combination of the segments. The individual example information 54 and example information per segment 56 in FIGS. 7A to 9C are used for compensating the lacking qualitative information and attribute information in the base function unit 32 and type function unit 34 in the insurance designing server 12.

FIGS. 10A to 10H show a specific example of the individual customer information 58 stored in the personal database 20 in FIGS. 2A and 2B. The individual customer information 58 in the personal database 20 stores individual customer attribute information 74, individual customer qualitative information 76, and event information 78 per name of the individual. The individual customer attribute information 74, individual customer qualitative information 76, and event information 78 are information entered fundamentally by the individual customer. If the individual customer attribute information 74 and individual customer qualitative information 76 are insufficient as input information, information extracted by a similarity search for the individual customer presumption information database 18 is used. Subsequently, a risk recognition degree 80, a compensation amount 82 for the risk, a subscribed insurance article 84, and a simulation history 86 are stored. The risk recognition degree 80, compensation amount 82 for the risk, subscribed insurance article 84, and simulation history 86 are obtained as a result of the insurance article design per individual by the insurance designing server 12. That is, the personal database 20 is a database in which the input information and the design result are stored per individual who designed the insurance. The individual customer information 58 in the personal database 20 is extracted every predetermined timing and reflected to the individual example information 54 and example information per segment 56 in the individual customer presumption information database 18. Therefore, as actual results of the design by the insurance designing server 12 progresses and an amount of information in the personal database 20 increases, its contents are more reflected to the individual example information 54 and example information per segment 56 in the individual customer presumption information database 18, the confidence degree of the individual customer presumption information database 18 which is used for compensating the lacking information increases, and the presumption information gradually evolves.

FIG. 11 shows a specific example of the insurance article database 22 connected to the database server 14 in FIGS. 2A and 2B. The insurance article database 22 is constructed by an article name 88, a main contract 90, a special contract 92, a restriction 94, and the like. As for the article name 88, article names such as "permanent life insurance", "term insurance", "pension", and the like are stored. Kinds of insurance such as "permanent life", "term", and "personal annuity" are stored in the main contract 90. Kinds of special insurance such as "term", "living compensation", "nursing", "sickness/disablement", "hospitalization" and the like are stored in the special contract 92. For example, a restriction compensation amount for the death compensation is stored in the restriction 94. Therefore, in the insurance designing server 12 in FIGS. 2A and 2B, by obtaining the insurance article which satisfies the necessary compensation amount by searching the insurance article database 22 on the basis of the necessary compensation amount calculated simultaneously with the risk recognition degree, the optimum insurance article is designed by the article designing unit 45.

Figure 12:
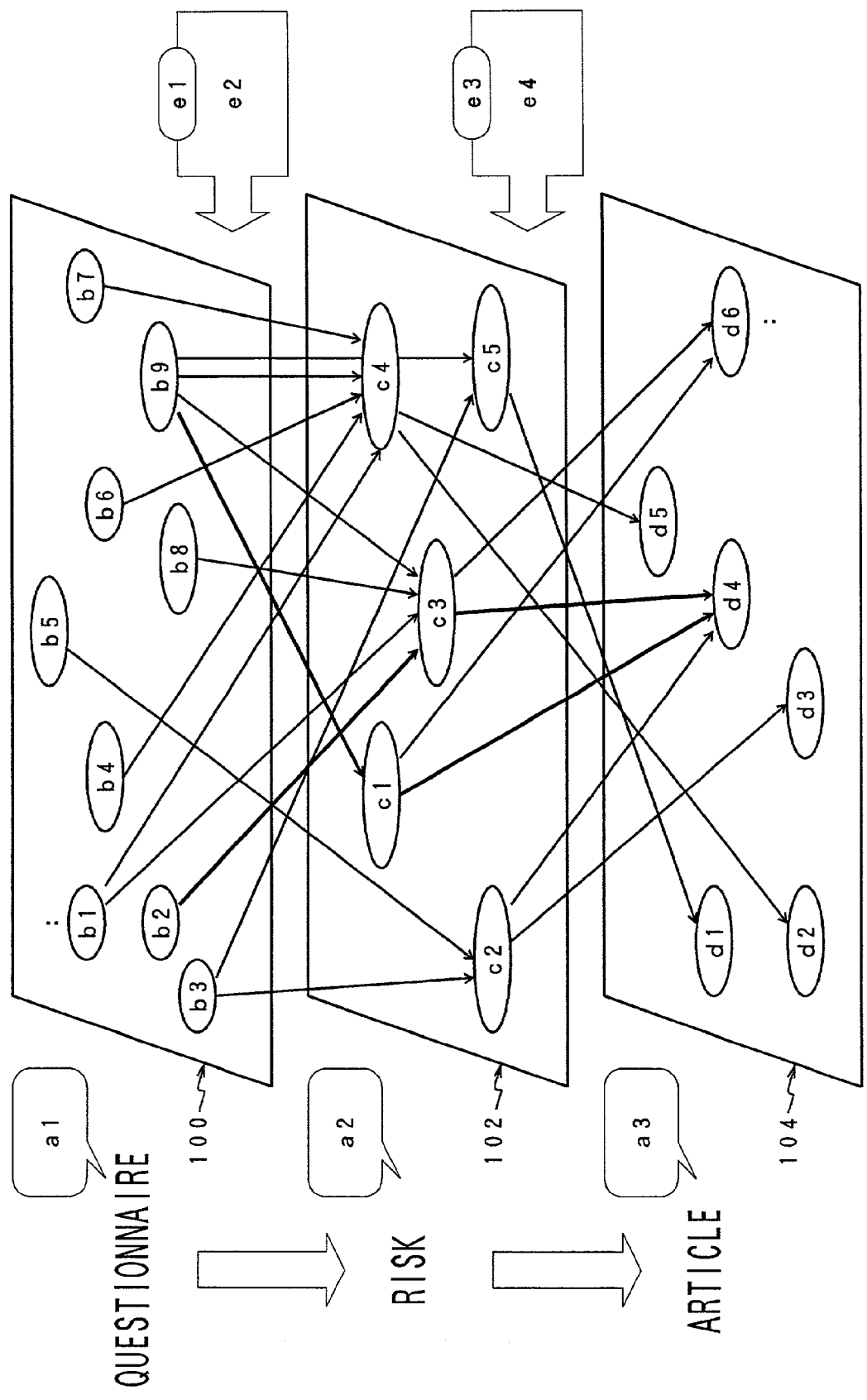
FIGS. 12A and 12B are explanatory diagrams of the relation between the risk recognition and the insurance articles according to the invention.
Figure 13:
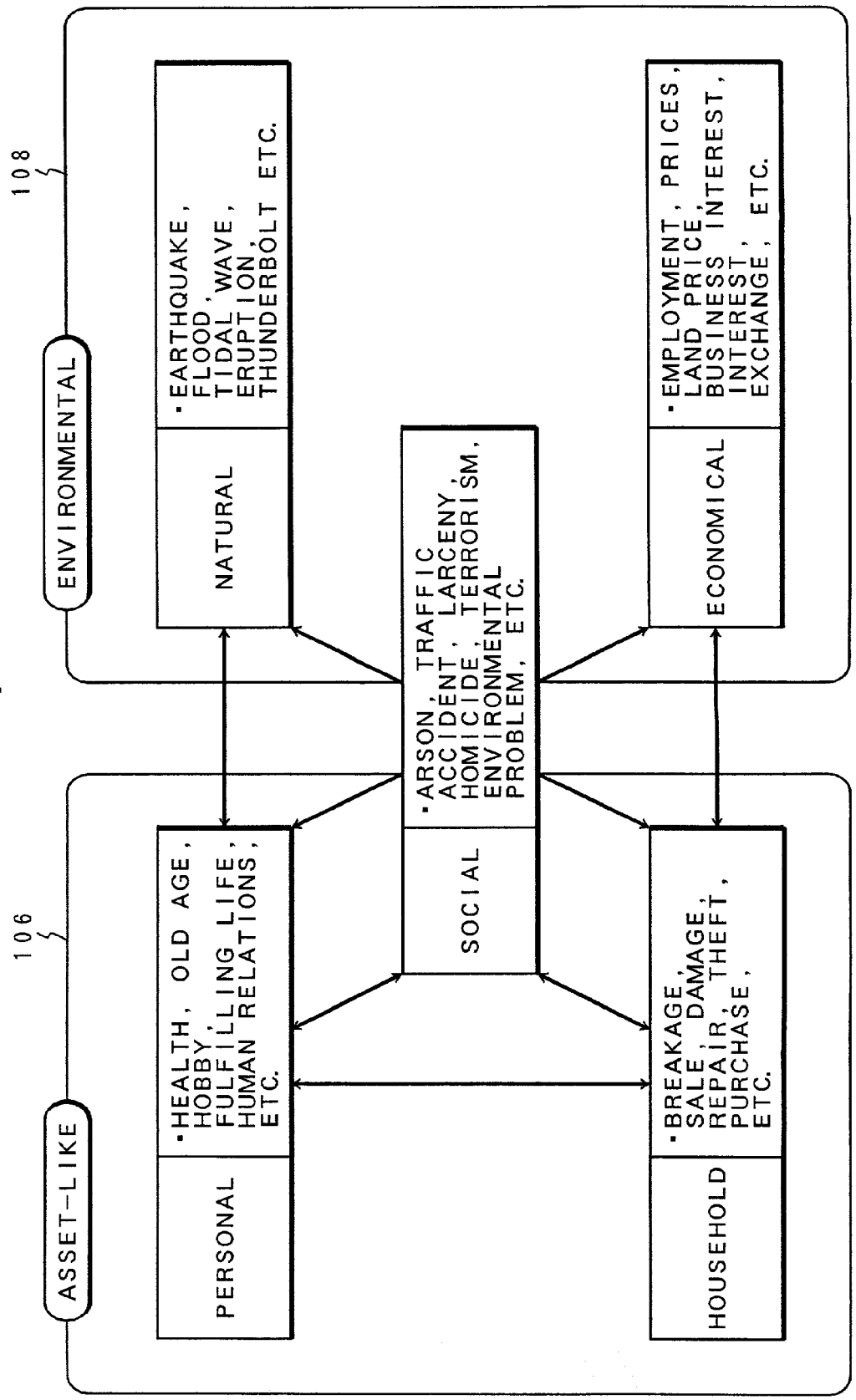
FIG. 13 is an explanatory diagram of the relation between the questionnaire application and the risks according to the invention.
Figure 15:
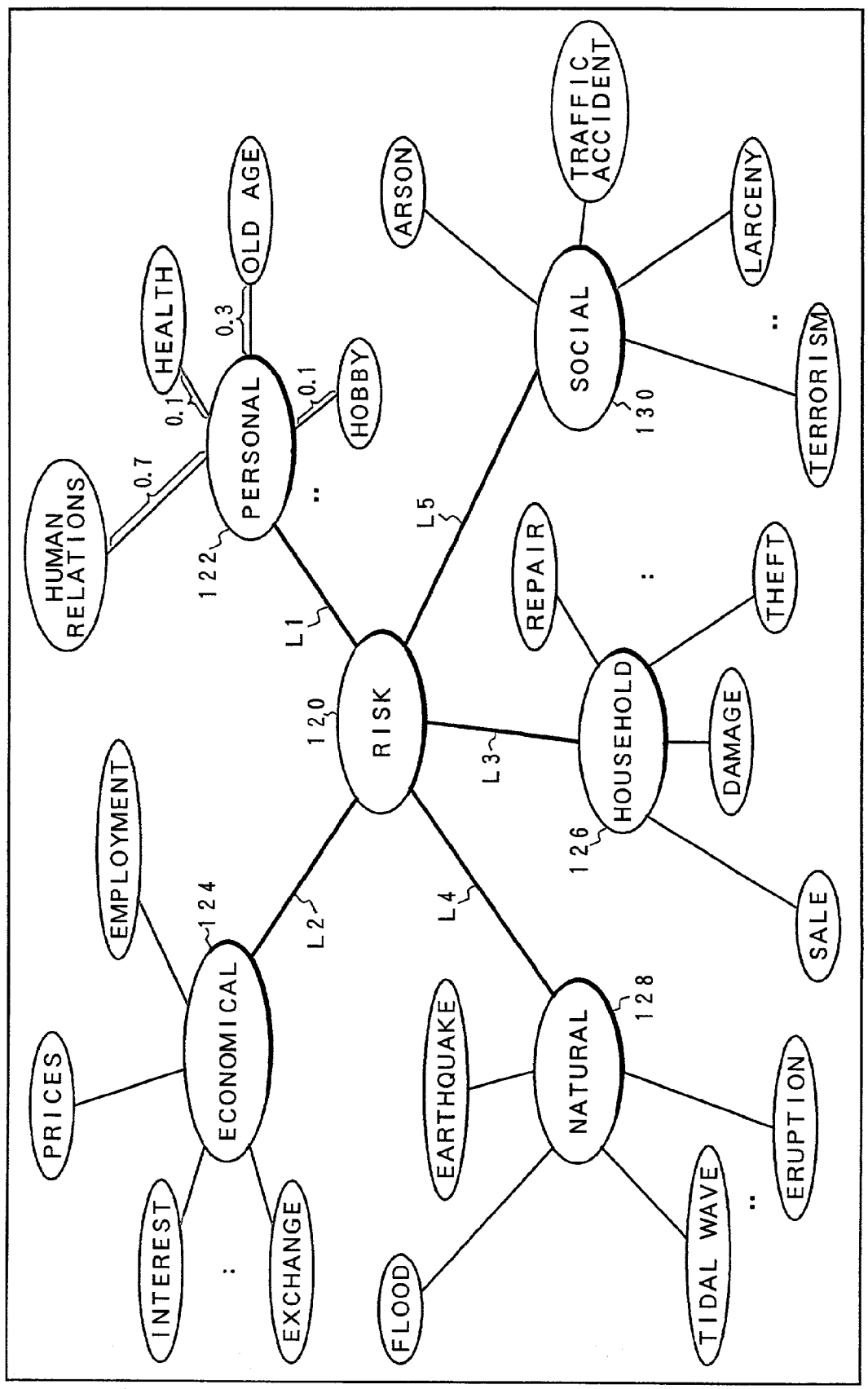
FIG. 15 is an explanatory diagram of a map image corresponding to FIGS. 12A and 12B.

Subsequently, the conversion table 24 provided for the database server 14 in FIGS. 2A and 2B will be explained. The questionnaire/risk conversion table information 24-1 is provided for the conversion table 24 and a correlation between the risk items and risk recognition degrees for the questionnaire items of the individual customer as qualitative information has been defined. Risk/insurance parts conversion table information 24-2 is also provided for the conversion table 24 and a correlation between the insurance articles and necessary compensation amounts for the risk items has been defined. FIGS. 12A and 12B show relations among questionnaire information, the risk recognition, and the article parts in the insurance design of the invention. First, a questionnaire space 100 defines the questionnaire items entered as qualitative information obtained by an answer about the anxiety degree for the risk of the individual customer. The questionnaire items in the questionnaire space 100 are associated with risk systems classified into five systems in a risk space 102. The risk systems in the risk space 102 are classified into an asset-like risk 106 and an environmental risk 108 as shown in FIG. 13. The questionnaire/risk conversion table information 24-1 defines a relation between the questionnaire space 100 and risk space 102. For example, the questionnaire/risk conversion table information 24-1 is constructed as shown in FIG. 14 and defines a relation between the questionnaire items and the risk systems. Further, the questionnaire/risk conversion table information 24-1 also defines a correlation with the risk recognition degrees and, for example, a conversion to the risk recognition degree can be calculated by previously determining numerical values in a range of 0 to 1, for example, "very anxious 0.2, slightly anxious 0.4, not very anxious 0.6, not anxious 0.8" every layer of the questionnaire information. Specifically speaking, as shown by a map image in FIG. 15, the risk recognition degree (distance) is obtained every risk item and an average risk recognition degree of a plurality of risk items belonging to the individual customer himself is used as a risk recognition degree of the risk system. For example, in the personal risk, human relations, health, old age, hobby, and the like are included as risk items, each risk recognition degree is converted as being "0.7", "0.1", "0.3", and "0.1" from the table, and an average value (L1=0.3) is used as a risk recognition degree L1 of the personal risk. The risk system of the risk space 102 is associated with the insurance article in an article space 103. This correlation is defined by the risk/insurance parts conversion table information 24-2. At the same time, the risk/insurance parts conversion table information 24-2 defines a relation with the necessary compensation amount.

Figure 16B:
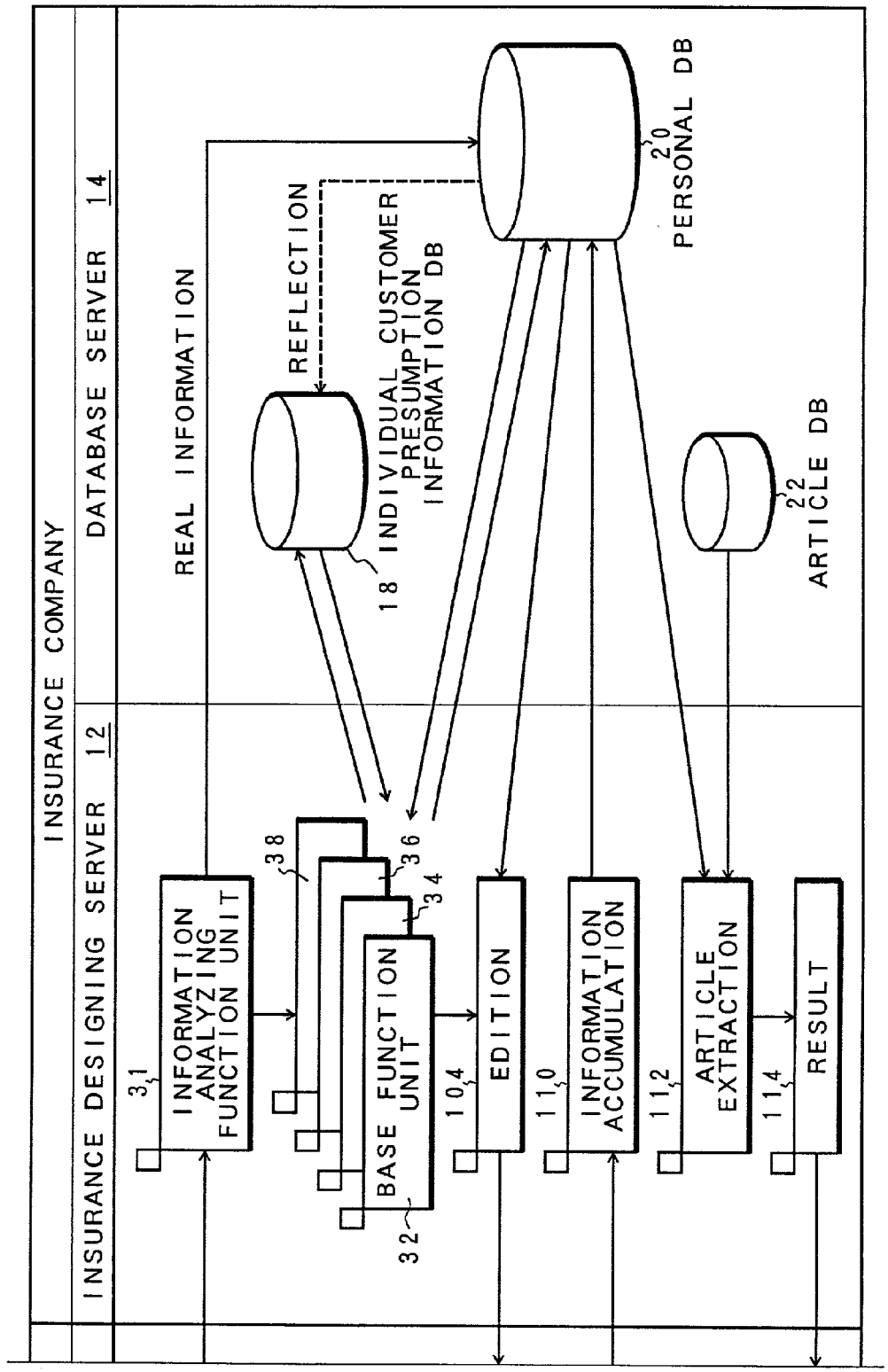

FIGS. 16A and 16B are explanatory diagrams showing a movement of a designing process by the automatic insurance designing apparatus according to the invention in FIGS. 2A and 2B. An input picture plane 98 is prepared for the WWW browser 28 and, when the information is entered by using the input picture plane 98, it is sufficient that the individual customer arbitrarily inputs the necessary individual customer information without being conscious of the insurance designing models of the base function unit 32, type function unit 34, risk measure function unit 36, and risk simulator function unit 38 on the insurance designing server 12 side. Specifically, if at least "sex" or "date of birth" is entered as attribute information 46, an automatic design can be performed by the fundamental model. The information entered by the individual customer by using the input picture plane 98 is transmitted through the input channel 101 and supplied to the insurance designing server 12 on the insurance company (including business offices) side via the WWW server 16 (not shown), the operation of the information analyzing function unit 31 is performed, and at the same time, the input information is stored as actual information into the personal database 20 on the database information side. In the insurance designing server 12, the information analyzing function unit 31 first analyzes the input information, and one of an trial edition 96-1, a complete edition 96-2, and a revision of insurance 96-3 is displayed on a display screen 96. According to the trial edition 96-1, an insurance design according to the fundamental model which makes the base function unit 32 operative or the risk model per individual customer type which makes the type function unit 34 operative is performed. In the complete edition 96-2, an insurance design by the risk evaluation model which makes the risk measure function unit 36 operative is performed on the basis of the input of the qualitative information 48. Further, in the revision of insurance 96-3, an insurance design by the risk change model which makes the risk simulator function unit 38 operative is performed on the basis of the input of the event information. Therefore, in the insurance designing server 12, one of the base function unit 32, type function unit 34, risk measure function unit 36, and risk simulator function unit 38 selected by the information analyzing function unit 31 operates and the attribute information and quantitative information to be stored in the personal database 20 are derived from the input information. In this case, when the attribute information or qualitative information are lacking, the lacking information is compensated by a similarity search of the individual example information or example information per segment stored in the individual customer presumption information database 18. When the individual customer qualitative information is obtained, the risk recognition degree and its necessary compensation amount are similarly calculated from the conversion table stored in the individual customer presumption information database 18. The risk recognition degree and necessary compensation amount calculated as mentioned above are converted into an image by edition 104 and displayed, for example, as a map image 105 on a channel on the individual customer side. That is, the map image is displayed in such a manner that a circle or an ellipse of an area corresponding to the necessary compensation amount is shown at the edge of a branch having a length corresponding to the risk recognition degree calculated for a center of the map image. When the individual customer views the map image 105, selects the risk item, and inputs conditions of a payable premium and the like, a condition input 107 is notified to the insurance designing server 12 and converted into an information accumulation 110, and reflected to the base function unit 32, type function unit 34, risk measure function unit 36, or risk simulator function unit 38 if necessary. The risk recognition degree and necessary compensation amount to which the condition input 107 has been added are calculated again by the search of the individual customer presumption information database 18. In addition, an article extraction 112 of the insurance article which satisfies the calculated necessary compensation amount is performed by the search of the insurance article database 22 and its result 114 is obtained. An article design result 116 is displayed on the channel on the individual customer side. If the additional input, correction, or the like of the information is further performed to the article design result 116, the necessary information is added by using the input picture plane 98. When there is the additional input, correction, or the like of the information, the processing routine is returned to the initial information input and the same process is repeated, so that an article design result after completion of the additional input or correction of the information can be obtained.

Figure 17A:
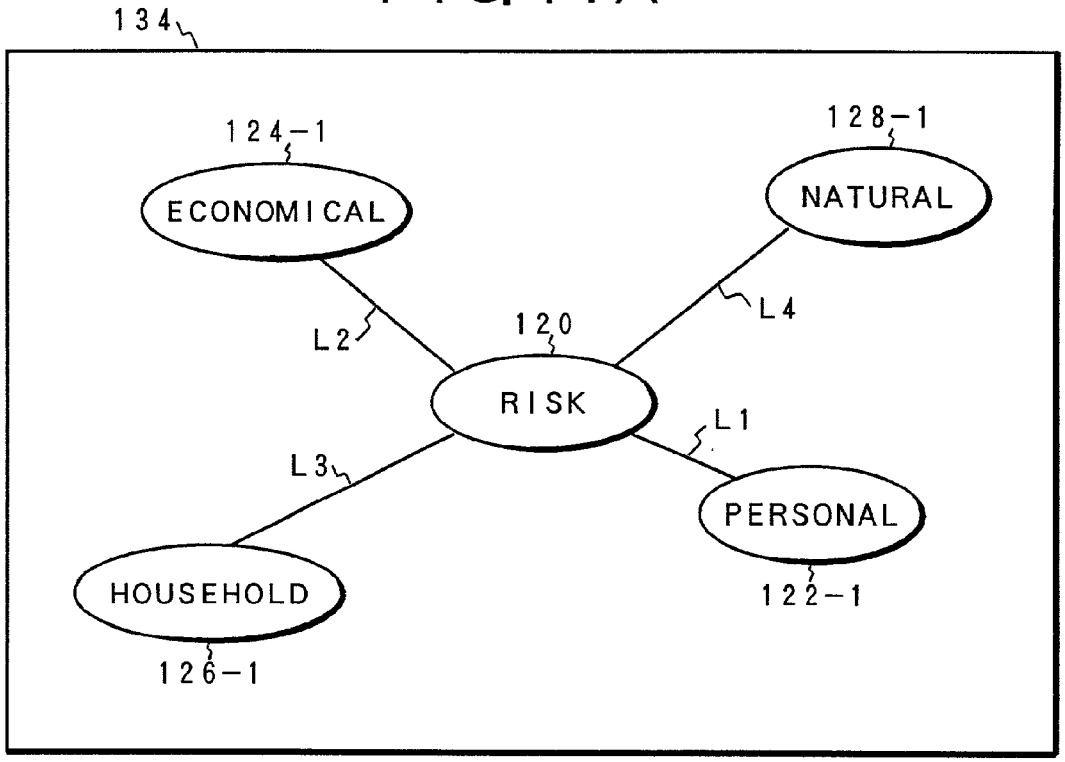
FIGS. 17A and 17B are explanatory diagrams of a map display in the case where attribute information is entered again after the risk recognition degrees and the necessary compensation amounts were calculated, thereby raising a confidence degree of the necessary compensation amounts.
Figure 17B:
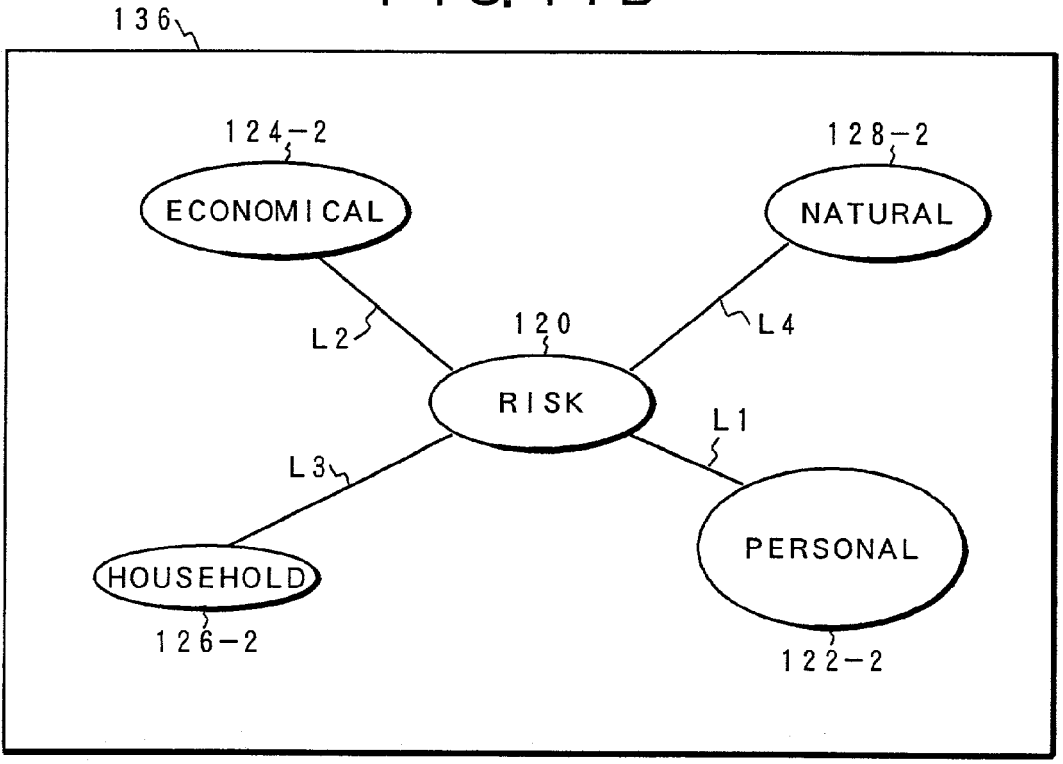

The automatic designing process using the risk evaluation model by the risk measure function unit 36 provided for the insurance designing server 12 in FIGS. 2A and 2B will be specifically explained as follows. First, in FIGS. 16A and 16B, the information analyzing function unit 31 analyzes the entered attribute information and qualitative information, and if sufficient information is obtained, the risk measure function unit 36 is selected, the "complete edition" 96-2 is displayed on the display screen 96 on the individual customer side, and the insurance design of the risk evaluation model by the risk measure function unit 36 is executed. In the risk measure function unit 36, the similarity search of the example information per segment 56 of the individual customer presumption information database 18 is executed by the risk recognition degree calculating unit 40 by using the entered qualitative information 48 and "sex" and "date of birth" serving as fundamental attribute information as keywords, thereby compensating the lacking attribute information. Subsequently, the questionnaire information as qualitative information is converted into the risk recognition degree by using the conversion table 24 in the individual costumer presumption information database 18. The risk is further converted into the necessary compensation amount. Thus, the attribute information, qualitative information, risk recognition degree, and necessary compensation amount which are necessary for the individual customer information 58 to be stored in the personal database 20 are obtained at this stage. Subsequently, the risk measure function unit 36 converts the calculated risk recognition degree and necessary compensation amount per risk item into a map image and a table format and allows them to be displayed as a map image 105 onto the WWW browser 28 of the individual customer. In this case, for example, it is assumed that a map image 134 as shown in FIG. 17A is displayed. Since only the fundamental information of "sex" and "date of birth" are entered as attribute information and the remaining attribute information is obtained by the similarity search of the individual customer presumption information, the confidence degrees of necessary compensation amounts 122-1, 124-1, 126-1, 128-1 of the map image 134 are fairly low. Therefore, it is assumed that the individual customer further inputs detailed information such as "address", "occupation", "marital status", "annual income", and the like in addition to the fundamental attribute information by further using the input picture plane 98. When the detailed information of the attribute information is entered, the insurance designing server 12 again updates the corresponding presumption information obtained by the similarity search in the individual customer information to be stored in the personal database 20 by the added attribute information, thereby forming individual information of a high confidence degree. In association with an increase in confidence degree by the additional attribute information, the necessary compensation amount which is calculated by the conversion table 24 is displayed, for example, as shown by a map image 136 in FIG. 17B. When the map image 136 is compared with the map image 134 obtained before the detail information is entered, an optimization such that the personal risk necessary compensation amount 122-1 is corrected to personal risk necessary compensation amount 122-2 in which the area is increased by the addition of the detail attribute information and the household risk necessary compensation amount 126-1 is changed to a household risk necessary compensation amount 126-2 in which the area is slightly small is executed. With respect to a calculation result of the necessary compensation amount of a high confidence degree calculated by the additional input of the attribute information, when the individual customer selects the risk item and the necessary compensation amount, a designing process for obtaining a combination of the insurance articles which satisfy the necessary compensation amount by searching the insurance article database 22 is performed by the article designing unit 45 on the basis of its selection result and a design result is displayed. Subsequently, an automatic designing process using a basic model by the base function unit 32 provided for the insurance designing server 12 in FIGS. 2A and 2B and an automatic designing process using a risk model per individual customer type by the type function unit 34 will be specifically explained as follows. Now, assuming that "sex" and "date of birth" are entered as attribute information 46 by using the input picture plane 98 of FIG. 16A, the information analyzing function unit 31 of the insurance designing server 12 analyzes the input of "sex" and "date of birth" as basic attribute information, displays the "trial edition" 96-1 onto the display screen, makes the base function unit 32 operative, and performs the insurance design based on the basic model. In the insurance design of the base function unit 32, the risk recognition degree calculating unit 40 performs a similarity search of the example information per segment 56 in the individual customer presumption information database 18 by using the entered basic attribute information "sex" and "date of birth" as keywords, thereby obtaining a risk recognition degree per risk item. That is, the similarity search of the example information per sex/age 56-3 in FIGS. 8C and 9C in the example information per segment 56 is performed, thereby obtaining a risk recognition degree per risk. If the risk recognition degree is obtained as mentioned above, a necessary compensation amount (including the insurance parts) of each risk item is obtained from the conversion table 24 in the individual customer presumption information database 18. If the risk recognition degrees and the necessary compensation amounts are obtained as mentioned above by the similarity search of the individual customer presumption information database 18 and by reference to the conversion table 24, for example, as shown in FIG. 17A, the risk recognition degrees are displayed on the WWW browser 28 of the individual customer by the map image 134 in which their lengths are set to L1 to L4 with respect to the center 120 and the necessary compensation amounts are expressed by elliptic areas and by the table format 62 shown in FIGS. 6A to 6C. If the additional input or correction of information is performed as necessary to the calculation results of the risk recognition degree and necessary compensation amount by the base function unit 32, a reprocess corresponding to the additionally entered information is performed. At this time, when "region of residence", "occupation", "marital status", "annual income", and the like are entered as additional information of the attribute information in addition to "sex" and "date of birth", the information analyzing function unit 31 of the insurance designing server 12 selects the type function unit 34, thereby allowing the insurance design by the risk model per individual customer type to be executed. The insurance design by the risk conversion model by the operation of the risk simulator function unit 38 will now be described. First, the event information 52 is entered in addition to the attribute information 46 and qualitative information 48 by using the input picture plane 98 of FIGS. 16A and 16B. Upon input of the event information, it is sufficient that the individual customer selects "yes" of the contents of the relevant event item in the event information 52 in FIG. 3D. The input of the event information is performed after the insurance design has already been completed by the base function unit 32, type function unit 34, or risk measure function unit 36. Naturally, the designing process of the risk simulator function unit 38 by the input of the event information can be also performed with respect to the insurance which has already been contracted or the insurance of another company as a target. When the event information 52 and the attribute information are entered from the individual customer to the insurance designing server 12, the information analyzing function unit 31 analyzes the input of the event information, selects the risk simulator function unit 38, and allows the "may-happen edition" 96-3 to be displayed on the display screen. The risk simulator function unit 38 obtains the individual customer information 58 of the corresponding individual customer from the personal database 20, obtains and compensates the lacking information in the event information in the individual customer information 58 by the similarity search of the individual customer information 58 or individual customer presumption information database 18, calculates the risk recognition degree of each risk item by using the individual customer information 58 including the event information, and also calculates the necessary compensation amount.

For example, if the event input is "marriage", "family construction" is added in the input attribute information, the risk recognition degree is extracted by the similarity search of the individual customer presumption information database 18 on the basis of the added attribute information, and the increased necessary compensation amount is calculated from the conversion table 24. A calculation result by the event input is comparison displayed together with the information before the event input.

Figure 18A:
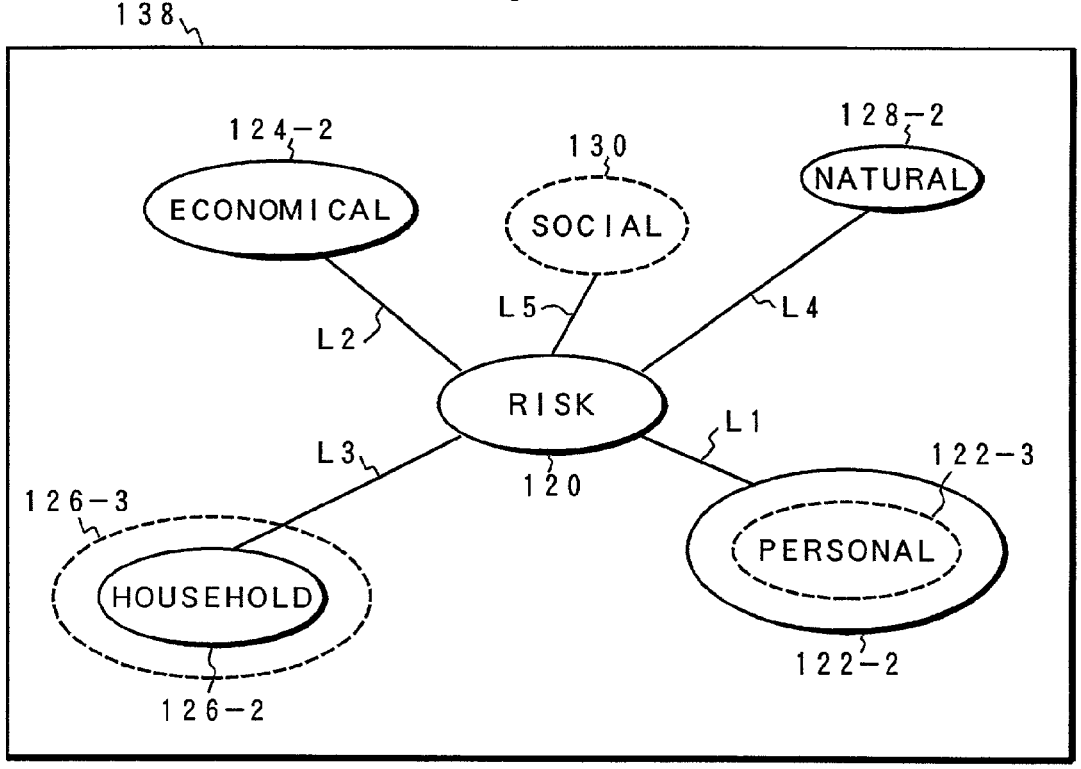
FIGS. 18A and 18B are explanatory diagrams of a map display in the case where the risk recognition degrees and the necessary compensation amounts are displayed in comparison with an existing contract and recombined.

For example, in a map image 138 in FIG. 18A, with respect to the risk recognition degree and necessary compensation amount before the input of the event information, necessary compensation amounts 122-2, 124-2, 126-2, and 128-2 are as shown by solid lines. On the other hand, the event information is entered and a redesign is performed, so that a personal risk necessary compensation amount 122-3 is displayed as shown by a broken line and a household risk necessary compensation amount 126-3 is displayed as shown by a broken line. Further, with respect to a new social risk which was not considered before the input of the event information, the social risk necessary compensation amount 130 having the length L5 corresponding to the risk recognition degree is displayed as shown by a broken line. Therefore, with respect to the personal risk, since the necessary compensation amount 122-3 obtained after the input of the event information is reduced smaller than the necessary compensation amount 122-2 before the input of the event information, it will be understood that the necessary compensation amount is comparatively higher than that before the input of the event information. On the contrary, with respect to the household risk, the compensation amount 126-3 obtained after the input of the event information is increased larger than the compensation amount 126-2 before the input of the event information, so that it will be understood that the necessary compensation amount is lacking in this case. Therefore, with respect to the calculation result accompanied by the input of the event information as mentioned above, when the individual customer side selects the calculation result obtained after the input of the event information, as shown in a map image 140 in FIG. 18B, with respect to the personal risk and household risk, actual compensation amounts 122-4 and 126-4 are adjusted so as to obtain the compensation amounts 122-3 and 126-3 after the input of the event information. A redesign or a recombination of a new insurance article is performed by using this result.

Figure 18B:
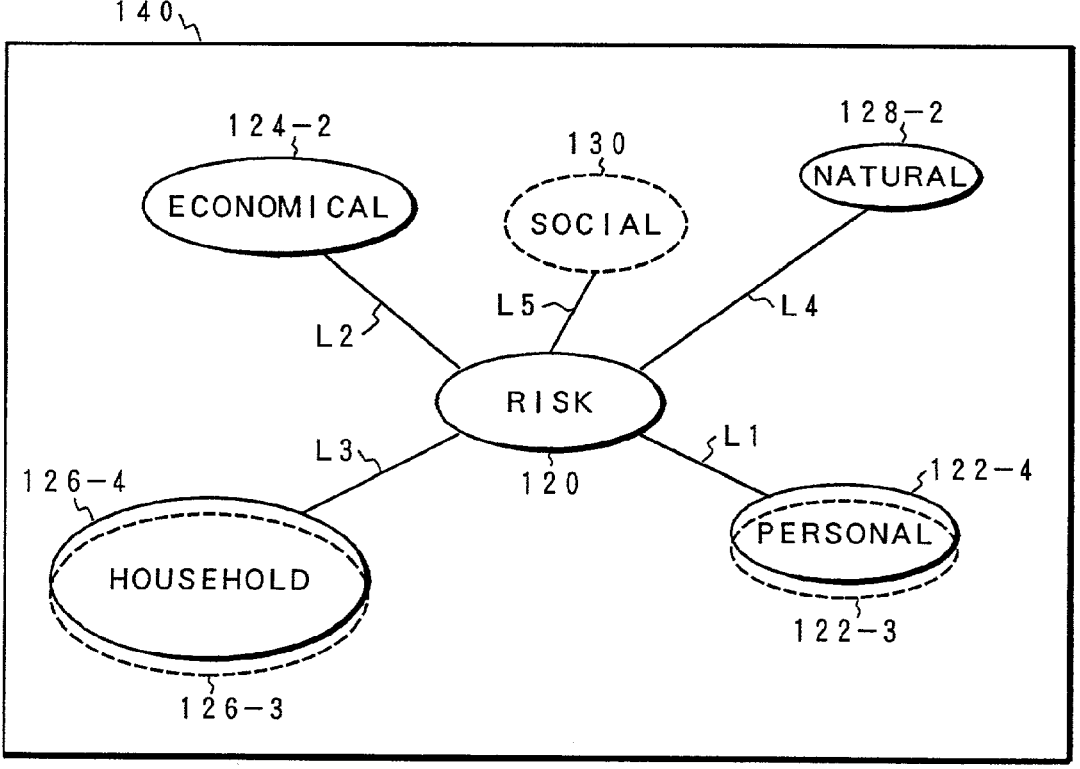

The comparison correction of the necessary compensation amounts shown in FIG. 18A or 18B is not limited at the time of the operation of the risk measure function unit 36 based on the input of the event information but can be also similarly applied with respect to a revision of the insurance such that, for example, in the designing process by the risk measure function unit 36, for the display of the map image of the risk recognition degree and necessary compensation amount based on the first information input, the insurance which has already been contracted or the contract insurance of another company is entered, different portions of the compensation amounts are displayed by broken lines as shown in FIG. 18A, and they are adjusted so as to become the compensation amounts as shown in FIG. 18B.

Figure 19B:
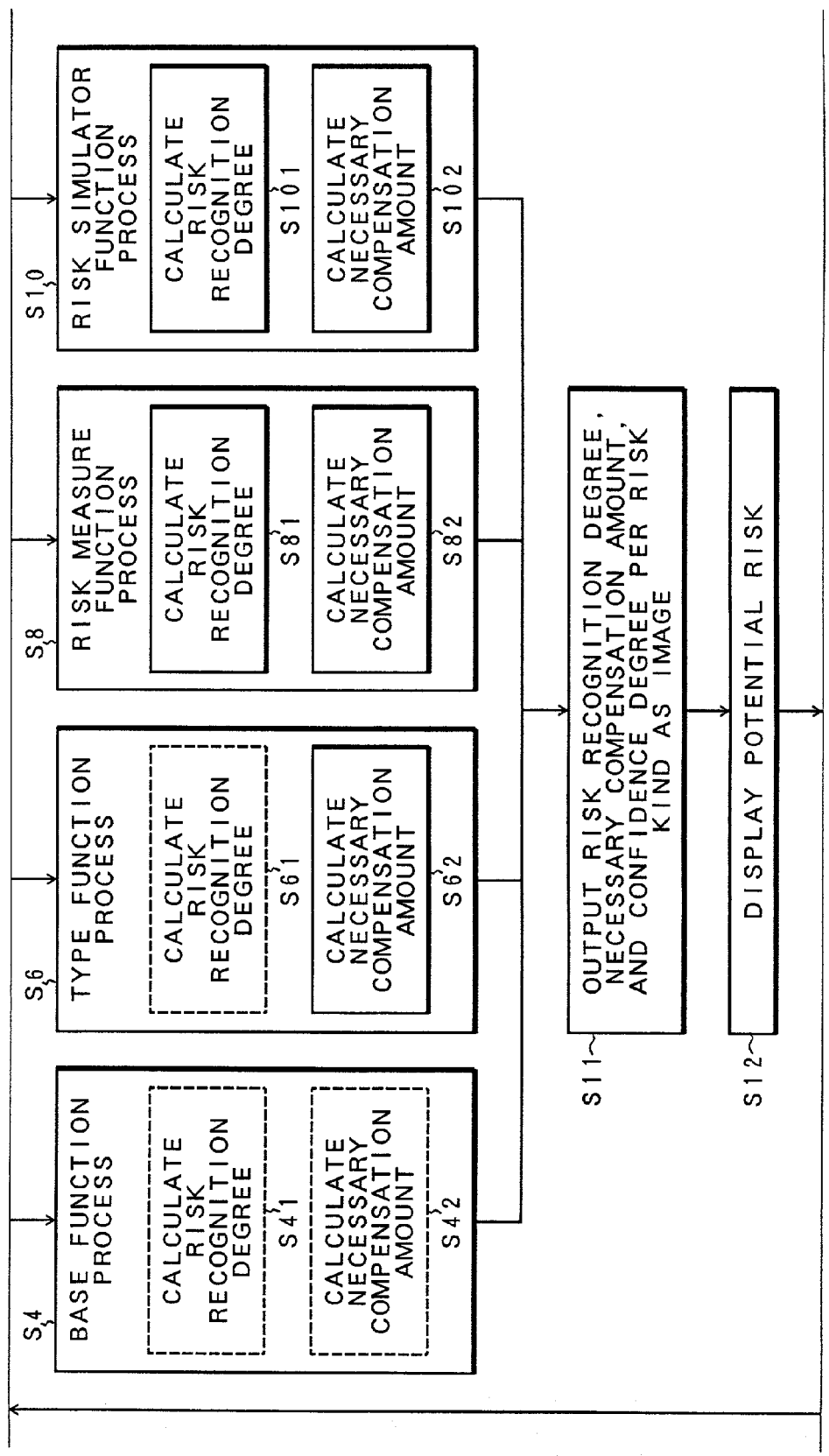

FIGS. 19A to 19C are flowcharts for the automatic insurance designing process of the invention by the insurance designing server 12 in FIGS. 2A and 2B. First, in step S1, the information necessary for the insurance design is entered. The attribute information, qualitative information, other company contracted information, event information, or the like is entered in this instance. Subsequently, in step S2, the information analyzing function unit 31 analyzes an amount of input information and selects the operation of one of the base function unit, type function unit, risk measure function unit, and risk simulator function unit. If the input information is the minimum necessary attribute information, the processing routine advances from step S3 to step S4 and the process of the base function unit is performed. If the attribute information of a moderate amount exists as shown in step S5, the process by the type function unit 34 in step S6 is performed. When the quantitative information and the sufficient attribute information are entered as shown in step S7, the process by the risk measure function unit 36 in step S8 is performed. Further, when the event information and the attribute information are entered as shown in step S9, the process by the risk simulator function unit 38 in step S10 is performed. Two processes of the calculation of the risk recognition degree and the calculation of the necessary compensation amount are included in the base function process, type function process, risk measure function process, and risk simulator function process in steps S4, S6, S8, and S10, respectively. When the calculation of the risk recognition degree and the calculation of the necessary compensation amount are finished in each processing function, the risk recognition degree, necessary compensation amount, and confidence degree per risk kind are displayed to the individual customer by a map image or a table format in step S11. In step S12, a potential risk such as a drop of asset value or the like is displayed as necessary. In step S13, the presence or absence of the adjustment of the confidence degree with regard to the necessary compensation amount is discriminated. If there is the adjustment of the confidence degree, a guidance regarding the input of the attribute information that is necessary for raising the confidence degree is displayed in step S19. After that, the processing routine is returned to step S1. The apparatus waits for input of new necessary information according to the guidance, specifically speaking, waits for additional input of the attribute information for raising the confidence degree. When such information is entered, the confidence degree adjusted risk recognition degree and necessary compensation amount, and further, the confidence degree are output and displayed in steps S2 to S11. If there is no adjustment of the confidence degree in step S13, step S14 follows and the presence or absence of a request for entering restricting conditions is discriminated. If there is the entering request of the restricting conditions, the restricting conditions regarding the article design are entered in step S15. As an input of the restricting conditions, for example, a risk desired to be compensated, a payable premium, an amenity bed, and the like are entered. If there is no input of the restricting conditions, the process in step S15 is skipped. Subsequently, in step S16, an insurance article which satisfies the calculated necessary compensation amount is extracted on the basis of the insurance article database 22 and, further, on the basis of the individual customer presumption information database 18 as necessary, and the optimum insurance article is designed and displayed. In step S17, a recommended insurance article is designed on the basis of the insurance article database 22 and individual customer presumption information database 18 and displayed. For example, with respect to the (monthly) payable premium in the restricting conditions in step S15, a necessary compensation amount for the risk recognition degree in the case where a certain amount is increased and an insurance article which satisfies the necessary compensation amount are designed by the apparatus itself and such an article is presented as a recommended insurance article.

Figure 20:
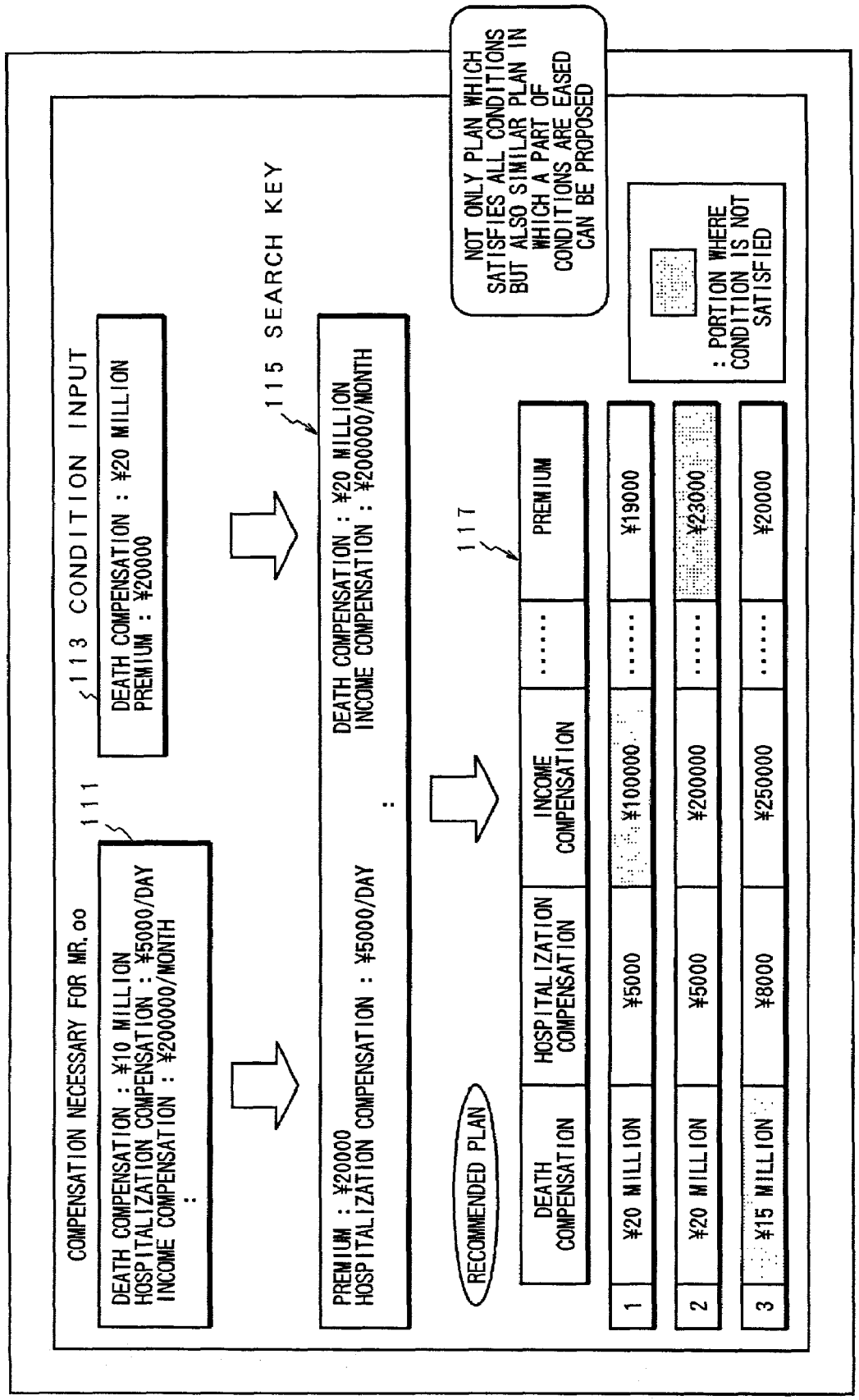
FIG. 20 is an explanatory diagram of a recommended article display in FIGS. 19A to 19C.

FIG. 20 shows a display example of a recommended insurance article. For the insurance article 111 displayed by the process in step S14, the new input condition 113 is set, the search key 115 is formed from both of them, and the three "recommended plans" 117 are designed and sequentially displayed from the plan of the high risk. The compensation amounts which do not satisfy the conditions among the "recommended plans" 117 are displayed as hatched images so as to be distinguished from the other portions. In step S18, the insurance article in step S16 and the recommended insurance article in step S17 are comparison displayed to the individual customer, thereby allowing the customer to select one of the insurance articles. In this way, a series of designing processes is finished. The process such as an actual insurance contract or the like which is executed after the individual customer selected the insurance article is executed as a process between the individual customer and the business person concerned of the insurance company after completion of a forming process of an agreement based on a result of the article selection.

The calculating process of the risk recognition degree and the calculating process of the necessary compensation amount in steps S4, S6, S8, and S10 in FIGS. 19A to 19C will now be described. First, the calculating process of the risk recognition degree in each of step S41 of the base function process and step S61 of the type function process surrounded by broken lines relates to the simple extraction of the risk recognition degree by the similarity search of the example information per segment 56 provided for the individual customer presumption information database 18 in FIGS. 2A and 2B. On the other hand, the calculating process of the risk recognition degree in each of step S81 of the measure function processing unit and step S101 of the risk simulator function process surrounded by solid lines is an extracting process of the risk recognition degree according to the conversion table 24. Its details are as shown in a risk recognition degree calculating process in FIG. 21.

Figure 21:
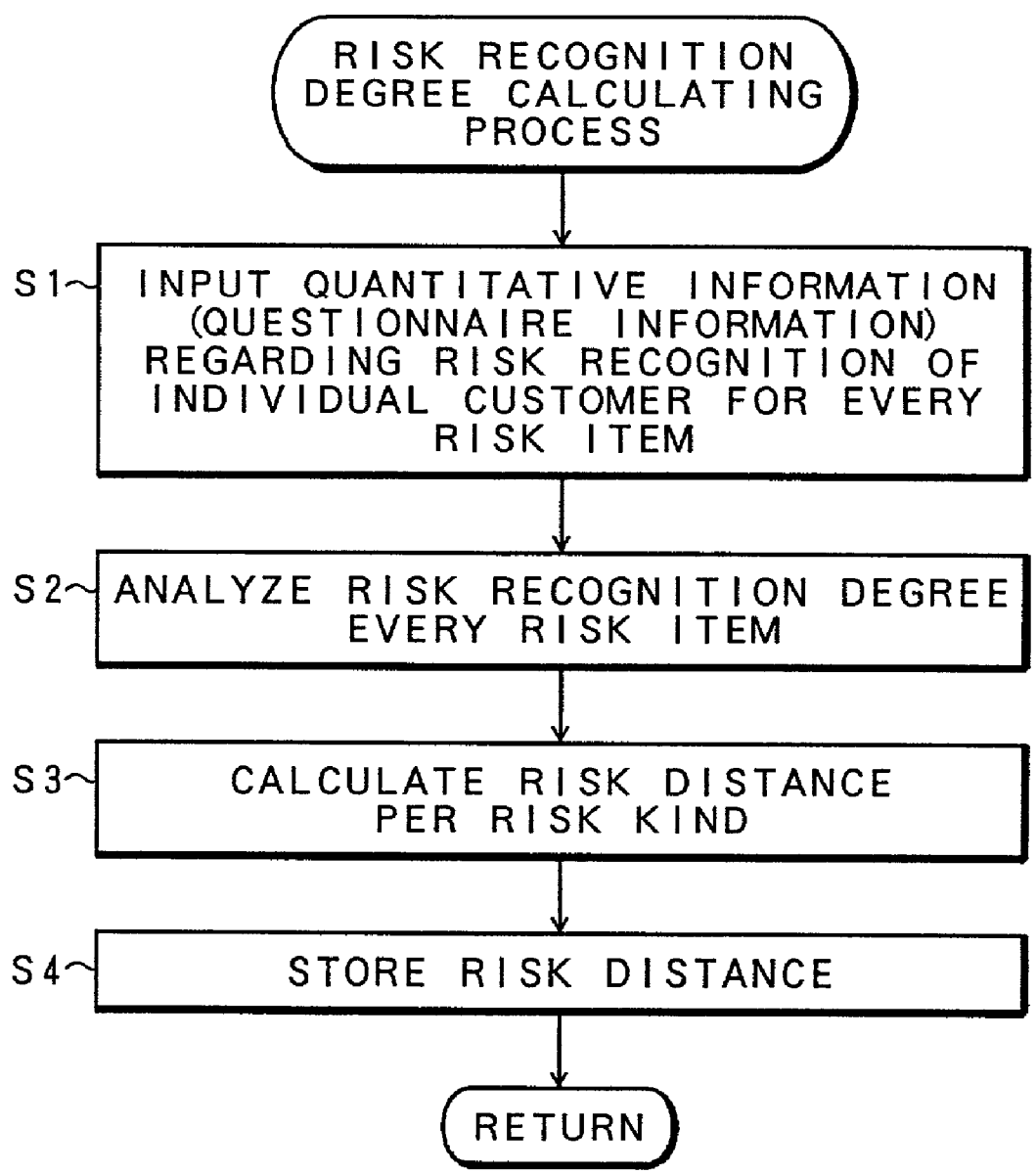
FIG. 21 is a flowchart for a risk recognition degree calculating process in a risk measure function process and a risk simulator function process in FIGS. 19A to 19C.

In the risk recognition degree calculating process in FIG. 21, the qualitative information regarding the risk recognition degree of the individual customer, specifically speaking, questionnaire information is entered every risk item in step S1. A risk recognition degree of an individual example is analyzed with reference to the conversion table 24 in step S2. Subsequently, a risk distance for every risk item is calculated in step S3. The calculated risk distance is stored in step S4. The necessary compensation amount calculating process in each of steps S4, S6, S8, and S10 in FIGS. 19A to 19C will now be described. Among them, only the process in step S42 for the necessary compensation amount calculation surrounded by the broken line in the base function process corresponds to the calculation of the necessary compensation amount based on the similarity search of the example information per segment provided for the individual customer presumption information database 18 in FIGS. 2A and 2B. On the other hand, as for necessary compensation amount calculating process in each of steps S62, S82, and S102 surrounded by solid lines in the type function process in step S6, risk measure function process in step S8, and risk simulator function process in step S10, besides the converting process by the similarity search of the individual customer presumption information database 18 in FIGS. 2A and 2B, it is also possible to input the attribute information of the individual customer and individually calculate the necessary compensation amount regarding each risk as shown in FIG. 22.

FIG. 22 shows the calculating process of the necessary compensation amount. The attribute information of the individual customer is entered in step S1. The necessary compensation amount regarding an old age risk is calculated in step S2. Upon calculation of the necessary compensation amount regarding the old age risk, living expenses at an old age are calculated from, for example, a white paper of national life, questionnaire information, or the like, a public annual amount is presumed, and the living expenses are subtracted from the public annual amount, thereby calculating a shortage and calculating the necessary compensation amount regarding the old age risk on the basis of the shortage. Subsequently, in step S3, a necessary compensation amount regarding the living risk is calculated. In step S4, a necessary compensation amount regarding the accident/disaster is calculated. In step S5, a necessary compensation amount regarding the death is calculated. In step S6, each necessary compensation amount is stored and a series of processes is finished. Also with respect to the calculation of the necessary compensation amount regarding the living risk, accident/disaster risk, and death risk in steps S3 to S5, in a manner similar to the case of the old age risk, a shortage is calculated by subtracting the necessary living expenses which have been prepared from the standard amount at the time of occurrence of the event, and the necessary compensation amounts are calculated in consideration of the shortage and the period. The necessary compensation amounts can be also calculated with reference to the experimental and statistical information of the insurance company.

An embodiment of a computer-readable recording medium in which a financial article automatic designing program of the invention has been stored will now be described. The program for realizing the functions as a financial article designing apparatus of the invention is formed as an application program which operates on, for example, Windows having the functions of the information analyzing function unit 31, the base function unit 32 having the risk recognition degree calculating unit 40 and compensation amount calculating unit 42, the type function unit 34, the risk measure function unit 36, the risk simulator function unit 38, an output display unit 44, and the article designing unit 45 like an insurance designing server 12 in FIGS. 2A and 2B. The financial article automatic designing program for realizing the functions of the invention as mentioned above is stored in a portable recording medium such as CD-ROM, floppy disk, DVD, magneto-optic disk, IC card, or the like or installed from a database or another computer system by using a modem or an LAN interface. The installed financial article automatic designing program of the invention is entered to the computer system and executed as an insurance automatic designing tool which is used by, for example, the individual customer or business channel. In this case, the financial article automatic designing program of the invention installed in the computer is stored in a hard disk HDD and executed by the CPU by using an RAM or the like.

As mentioned above, according to the invention, for example, in the case where the insurance article is automatically designed, the following effects are obtained.

First, the individual customer as a living person who uses the insurance can select the satisfactory insurance article by his own judgment. That is, since the risks held by himself are visualized, a difference between the actual risks and the potential risks can be grasped and the contents of the compensation to be subscribed can be judged by himself, so that the meaning of the insurance subscription can be clarified. The necessary compensation amount due to the future occurrence of the event can be visualized and confirmed. Further, the insurance articles can be designed or recombined mainly by the individual customer himself. The insurance design can be easily executed while he enjoys it by himself. Moreover, since the individual customer himself can grasp a too-much/shortage state such as unnecessary compensation or leakage of a necessary compensation and the insurance article can be selected mainly by the customer himself, a wasteful work such that the business personnel visits the customer many times is eliminated. The risk recognition degree, necessary compensation amount, and further, the recommended article can be presented even only by the minimum necessary personal information. Therefore, an amount of information which is disclosed by the level of the insurance design desired by the customer can be controlled by the customer himself.

In the sales channel of the insurance, even if the business personnel does not have sufficient financial know-how, he can sell the financial article such as an insurance. Even if an information amount is small, the insurance article suitable for the individual customer can be recommended. Thus, the alternative articles based on priority of the needs of the individual customer can be also proposed and profits can be eventually improved.

The timely revision of the insurance can be proposed and a leading sales and conversation adapted to the individual customer are realized, so that an increase in number of consultation items from the individual customer can be expected and the effect of the insurance can be visualized. Therefore, the number of cancellation cases is reduced and a self-declaration of a change in life stage of the individual customer is eventually promoted, thereby enabling an efficient approach to the individual customer to be realized.

Further, when seen from the insurance company side, profits of the insurance company and the brand royalty can be improved. That is, the number of new contracts can be increased, the costs which are required for getting the individual customers of new contracts can be reduced, and further, non-confronting sales such as Internet sales or the like can be realized. The strong reliability relationship with the individual customer can be established. An increase in the individual customer layer owing to rumor or the like from the individual customers having high satisfaction can be expected. Moreover, since the personal attribute information entered by the individual customer himself and the qualitative information showing an idea for the risks are accumulated, by utilizing those information, new individual customer segments can be found out and a new article can be developed in consideration of the needs of the individual customer. Thus, the brand royalty can be improved.

Although the embodiment has been described with respect to the example of the automatic design of the insurance as a financial article, an automatic design can be similarly performed with respect to the financial article to which the risk recognition degree of the individual customer can be reflected other than the insurance. As such an automatic design of the financial article corresponding to the risk of the individual customer, for example, there are the following items.

I. Investment funds such as investment trust, stocks, or the like

II. Stable funds such as single payment endowment insurance, time deposit, government bonds, etc.

III. Use scheduled funds using time deposit, time reserve fund, government bonds, etc.

IV. Liquidity funds using deposit, insurance multiple purpose bank account, MMF, MRF, government bonds, etc.

With respect to such financial articles, in a manner similar to the case of the insurance automatic design, information necessary to design the financial article is entered by the information input unit. A risk recognition degree is calculated by the risk recognition degree calculating unit on the basis of the qualitative information indicative of an anxiety degree of the individual customer for the risk. At the same time, a necessary amount of the financial article for the risk is calculated by the necessary compensation amount calculating unit on the basis of the attribute information of the individual customer. The calculated risk recognition degree is presented and the necessary amount of the financial article is lent and presented to the individual customer by the output display unit. It is sufficient to allow the designing unit to design an optimum financial article which satisfies the necessary amount of the financial article selected by the individual customer.

The invention is not limited to the foregoing embodiment but incorporates many modifications and variations without losing the objects and advantages of the invention. The invention is not limited by the numerical values shown in the foregoing embodiment.

What is claimed is:

1. A computer-readable recording medium storing a designing program of a financial article, the program causing a computer to execute:

entering information necessary for an insurance article;

calculating a risk recognition degree on the basis of qualitative information entered in said entering information, which are indicative of recognition of an individual customer for a risk entered in said entering information, and when said qualitative information is not entered, obtaining qualitative information by searching a database and calculating a risk recognition degree;

calculating a necessary compensation amount for the risk recognized by the individual customer or a necessary compensation amount based on attribute information of the individual customer;

adjusting a distance of a branch from a center in accordance with said calculated risk recognition degree;

adjusting an area of a graphic arranged at a leading end of said branch in accordance with said calculated necessary compensation amount;

outputting and displaying said risk recognition degree and said necessary compensation amount on a map image that expresses said risk recognition degree in the distance of the branch from the center and expresses said necessary compensation amount in the area of the graphic arranged at the leading end of said branch; and designing and providing an optimum insurance article which satisfies the necessary compensation amount for said risk recognition degree.

2. A recording medium according to claim 1, wherein said database comprises:

an individual customer presumption information database in which individual example information constructed by attribute information of the individual customer, qualitative information, a risk recognition degree, a necessary compensation amount for the risk, and an insurance article and example information per segment constructed by attribute information, qualitative information, a risk recognition degree, a necessary compensation amount for the risk, and an insurance article each of which is segmented by a predetermined category are stored;

a personal database in which individual customer information constructed by attribute information of the individual customer, qualitative information, a risk recognition degree, a necessary compensation amount for the risk, and an insurance article is stored; and a conversion table in which questionnaire/risk conversion table information, which defines a correlation between risk items serving as said qualitative information for questionnaire items of the individual customer and the risk recognition degree, and risk/insurance parts conversion table information, which defines a correlation between the insurance articles for the risk items and the necessary compensation amounts, are stored, wherein in said calculating a risk recognition degree, the risk recognition degrees corresponding to the qualitative information are obtained from said conversion table and displayed and, at the same time, in said calculating a necessary compensation amount, the necessary compensation amounts corresponding to the risk items are obtained from said conversion table and displayed.

3. A recording medium according to claim 2, wherein the information stored in said personal database is reflected at a predetermined timing in said individual customer presumption information database.

4. A recording medium according to claim 2, wherein there is further provided selecting a design function in response to an input information degree entered by the individual customer, and displaying the same.

5. A recording medium according to claim 2, wherein, when only attribute information of a customer is entered from said entering information, said calculating a risk recognition degree fills up shortage of the qualitative information by a similarity retrieval of said individual customer presumption information database using said qualitative information, and extracts a risk recognition degree for display, and simultaneously, said calculating a necessary compensation amount extracts necessary compensation amounts for display through conversion of the risk using said conversion table or similarity retrieval of said individual customer presumption information database of the said qualitative information.

6. A recording medium according to claim 2, wherein, when only part of the attribute information of a customer is entered in said entering information, said calculating a risk recognition degree fills up shortage of the qualitative information by a similarity retrieval of said individual customer presumption information database using said qualitative attribute information, and extracts a risk recognition degree for display, and simultaneously, said calculating a necessary compensation amount determines for display a necessary compensation amount through similarity retrieval of said individual customer presumption information database.

7. A recording medium according to claim 1, wherein said calculating a necessary compensation amount calculates a likelihood of a necessary compensation amount from the ratio of the number of inputs from the customer relative to the total number of attribute information and weighting of input items, and displays the calculated likelihood together with a risk recognition degree and a compensation amount.

8. A recording medium according to claim 7, wherein said calculating a necessary compensation amount displays a guideline for entering attribute information for improving likelihood upon display of the risk recognition degrees and the necessary compensation amount.

9. A recording medium according to claim 1, wherein said risk recognition degree has a value inversely proportional to the magnitude of the necessary compensation amount.

10. A recording medium according to claim 1, wherein the qualitative information entered in said entering information comprises response information to a questionnaire that includes risk items and a plurality of levels of recognition of risk for each risk item.

11. A recording medium according to claim 1, wherein said risk recognition degree and said compensation amount are displayed in the form of output of a table in the order of from high to low levels of risk.

12. A recording medium according to claim 1, wherein, when existing contract information is acquired in said entering information or from said database the map image of the risk recognition degree and the compensation amount currently displayed comparatively displays the risk recognition degree and the necessary compensation amounts in said existing contract information.

13. A recording medium according to claim 1, wherein, when event information covering an event is entered, after a policy of a designed insurance article becomes effective and the insurance is subscribed, a risk recognition degree and compensation amounts for individual risks are determined for display on the basis of said event information in said calculating a risk recognition degree and said calculating a necessary compensation.

14. A recording medium according to claim 1, wherein said designing and providing an optimum insurance article redesigns an insurance article so as to fill up a difference between the necessary compensation amount for each risk and the current compensation amount, or to satisfy anew a necessary compensation amount for each risk.

15. A recording medium according to claim 1, wherein designing and providing an optimum insurance article further designs and displays a recommended insurance article substantially satisfying a necessary compensation amount for the risk of a customer.

16. An automatic designing apparatus of a financial article, comprising:
- an information input unit which inputs information necessary for an insurance article;
- a risk recognition degree calculating unit which calculates a risk recognition degree on the basis of qualitative information indicative of recognition of an individual customer for a risk entered from said information input unit, and in the case where said qualitative information is not entered, obtains qualitative information by searching a database, and calculates a risk recognition degree;
- a compensation amount calculating unit which calculates a necessary compensation amount for the risk recognized by the individual customers or a necessary compensation amount based on attribute information of the individual customers;
- a branch adjusting unit which adjusts a distance of a branch from a center in accordance with said calculated risk recognition degree;
- an area adjusting unit which adjusts an area of a graphic arranged at a leading end of said branch in accordance with said calculated necessary compensation amount;
- an output display unit which outputs and displays said risk recognition degree and said necessary compensation amount on a map image that expresses said risk recognition degree in the distance of the branch from the center and expresses said necessary compensation amount in the area of the graphic arranged at the leading end of said branch; and
- an article designing unit which designs an optimum insurance article which satisfies the necessary compensation amount for the risk recognition degree displayed by said output display unit and provides the same.

17. An automatic designing method of a financial article, comprising:
- entering information necessary for a financial article;
- calculating a risk recognition degree on the basis of qualitative information entered in said entering information, which are indicative of recognition of an individual customer for a risk and when said qualitative information is not entered, obtaining qualitative information by searching a database, and calculating a risk recognition degree;
- calculating a compensation amount necessary for the financial article for the risk recognized by the individual customers or an amount necessary for the financial article based on attribute information of the individual customer;
- adjusting a distance of a branch from a center in accordance with said calculated risk recognition degree;
- adjusting an area of a graphic arranged at a leading end of said branch in accordance with said calculated necessary compensation amount;
- outputting and displaying said risk recognition degree and said necessary compensation amount on a map image that expresses said risk recognition degree in the distance of the branch from the center and expresses said necessary compensation amount in the area of the graphic arranged at the leading end of said branch; and
- designing an optimum financial article which satisfies said necessary compensation amount for said risk recognition degree and providing the same.

18. An automatic designing method of a financial article, comprising:
- entering information necessary for an insurance article;
- calculating a risk recognition degree on the basis of qualitative information entered in said entering information, which are indicative of recognition of an individual customer for a risk, and when said qualitative information is not entered, obtaining qualitative information by searching a database, and calculating a risk recognition degree;
- calculating a necessary compensation amount for the risk recognized by the individual customers or a necessary compensation amount based on attribute information of the individual customer;
- adjusting a distance of a branch from a center in accordance with said calculated risk recognition degree;
- adjusting an area of a graphic arranged at a leading end of said branch in accordance with said calculated necessary compensation amount;
- outputting and displaying said risk recognition degree and said necessary compensation amount on a map image that expresses said risk recognition degree in the distance of the branch from the center and expresses said necessary compensation amount in the area of the graphic arranged at the leading end of said branch; and
- designing an optimum financial article which satisfies said necessary compensation amount for said risk recognition degree and providing the same.

19. A method according to claim 17, wherein said database comprises:
- an individual customer presumption information database in which individual example information constructed by attribute information of the individual customer, qualitative information, a risk recognition degree, a necessary compensation amount for the risk, and an insurance article and example information per segment constructed by attribute information, qualitative information, a risk recognition degree, a necessary compensation amount for the risk and an insurance article each of which is segmented by a predetermined category are stored;
- a personal database in which individual customer information constructed by attribute information of the individual customer, qualitative information, a risk recognition degree, a necessary compensation amount for the risk, and an insurance article is stored; and a conversion table in which questionnaire/risk conversion table information which defines a correlation between risk items serving as said qualitative information for questionnaire items of the individual customer and the risk recognition degree and risk/insurance parts conversion table information which defines a correlation between the insurance articles for the risk items and the necessary compensation amounts are stored, wherein said risk recognition degree corresponding to said qualitative information are obtained from said conversion table and displayed and, at the same time, in said calculating a necessary compensation amount, the necessary compensation amounts corresponding to said risk items are obtained from said conversion table and displayed.

20. An automatic designing method of a financial article, comprising:

entering information necessary for a financial article;

calculating a risk recognition degree on the basis of qualitative information entered in said entering information, which are indicative of recognition of an individual customers for a risk, and when said qualitative information is not entered, obtaining qualitative information by searching a database, and calculating a risk recognition degree;

calculating a necessary amount of the financial article for the risk recognized by the individual customers or a necessary amount of the financial article based on attribute information of the individual customers;

adjusting a distance of a branch from a center in accordance with said calculated risk recognition degree;

adjusting an area of a graphic arranged at a leading end of said branch in accordance with said calculated necessary compensation amount;

outputting and displaying said risk recognition degree and said necessary amount on a map image that expresses said risk recognition degree in the distance of the branch from the center and expresses said necessary compensation amount in the area of the graphic arranged at the leading end of said branch; and designing an optimum financial article which satisfies said necessary amount for said risk recognition degree and providing the same.

21. A computer-readable recording medium in which an automatic designing program of a financial article is stored, wherein said automatic designing program causes a computer to execute:

entering information necessary for an insurance article;

calculating a risk recognition degree on the basis of entered qualitative information showing a recognition of the individual customers for a risk and when said qualitative information is not entered, obtaining qualitative information by searching a database and calculating a risk recognition degree;

calculating a necessary compensation amount for the risk recognized by the individual customers or a necessary compensation amount based on attribute information of the individual customers;

adjusting a distance of a branch from a center in accordance with said calculated risk recognition degree;

adjusting an area of a graphic arranged at a leading end of said branch in accordance with said calculated necessary compensation amount;

outputting and displaying said risk recognition degree and said necessary compensation amount on a map image that expresses said risk recognition degree in the distance of the branch from the center and expresses said necessary compensation amount in the area of the graphic arranged at the leading end of said branch; and designing an optimum insurance article which satisfies the necessary compensation amount for the risk recognition degree which was output and displayed and providing the same.

* * * * *

UNITED STATES PATENT AND TRADEMARK OFFICE
CERTIFICATE OF CORRECTION

| | |
|---|---|
| PATENT NO. | : 7,376,575 B2 |
| APPLICATION NO. | : 09/947530 |
| DATED | : May 20, 2008 |
| INVENTOR(S) | : Hideki Ohmoto et al. |

Page 1 of 1

It is certified that error appears in the above-identified patent and that said Letters Patent is hereby corrected as shown below:

Column 27, Line 5, change "database" to --database,--.

Column 28, Line 63, change "risk" to --risk,--.

Column 30, Line 15, change "risk" to --risk,--.

Signed and Sealed this

Twenty-first Day of October, 2008

JON W. DUDAS
*Director of the United States Patent and Trademark Office*